(12) United States Patent
Nakamura et al.

(10) Patent No.: US 7,536,900 B2
(45) Date of Patent: May 26, 2009

(54) LEAK DETECTOR AND LEAK DETECTING SYSTEM USING THE SAME

(75) Inventors: Toshimi Nakamura, Saitama (JP); Kiyoshi Yamagishi, Saitama (JP); Atsushi Koike, Saitama (JP); Kiyotaka Yanagi, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 220 days.

(21) Appl. No.: 10/564,129

(22) PCT Filed: Jun. 30, 2004

(86) PCT No.: PCT/JP2004/009611

§ 371 (c)(1),
(2), (4) Date: Jan. 11, 2006

(87) PCT Pub. No.: WO2005/005948

PCT Pub. Date: Jan. 20, 2005

(65) Prior Publication Data

US 2006/0230826 A1    Oct. 19, 2006

(30) Foreign Application Priority Data

Jul. 11, 2003  (JP)  ............................. 2003-195674
Jul. 11, 2003  (JP)  ............................. 2003-195675

(51) Int. Cl.
*G01M 3/04* (2006.01)

(52) U.S. Cl. .............................. 73/49.2; 73/291; 73/40

(58) Field of Classification Search .............. 73/204.19, 73/291, 861.01
See application file for complete search history.

(56) References Cited

U.S. PATENT DOCUMENTS 3,538,746 A * 11/1970 Ginsburgh et al. ........... 73/49.2
4,732,035 A *  3/1988 Lagergren et al. ............ 73/49.2
5,950,487 A *  9/1999 Maresca et al. ................ 73/293

FOREIGN PATENT DOCUMENTS

| EP | 1 326 062 A1 | 7/2003 |
| JP | 62-223640 A | 10/1987 |
| JP | 2000-16500 A | 1/2000 |
| JP | 2002-54964 A | 2/2002 |
| WO | WO 03/052372 A | 6/2003 |

* cited by examiner

*Primary Examiner*—Hezron Williams
*Assistant Examiner*—Mark Shabman
(74) *Attorney, Agent, or Firm*—Sughrue Mion, PLLC

(57) ABSTRACT

A leak detecting system includes a leak detector that detects leakage of liquid stored in a tank based on fluctuation in a level of the liquid. The leak detector includes a liquid inlet/outlet portion through which the liquid in the tank flows in and out, a flow-rate measuring unit configured to measure an amount of flow of the liquid inside the leak detector, and a liquid retaining portion configured to retain liquid flowing therein through the liquid inlet/outlet portion. A lower end of the leak detector is detachably attached to a bottom plate of the tank, and an upper end of the leak detector is supported in a gauging port in a top plate in such a manner that the leak detector is movable in a vertical direction.

15 Claims, 18 Drawing Sheets

LEAK DETECTOR AND LEAK DETECTING SYSTEM USING THE SAME

TECHNICAL FIELD

The present invention relates to a leak detector that detects leakage of a liquid stored in a tank and the like, based on the fluctuation in the level of the liquid, and a leak detecting system that uses the leak detector.

BACKGROUND ART

Conventionally, to detect leakage of an above-ground or underground storage tank storing liquid such as heavy oil, gasoline, solvent, a leak detector installed in the tank detects fluctuation in a level of the liquid stored in the tank. Based on a result of detection, it is determined whether leakage is occurring (see Japanese Patent Application Laid-Open No. 2000-16500).

FIG. 17 is a schematic sectional view of a tank 100 having a conventional leak detector 110 installed therein. In FIG. 17, the leak detector 110 is passed through a gauging port 102, provided in a top plate 101 of the tank 100, and is installed in the tank 100 so that a flow-rate measuring unit 111 is positioned vertically below a liquid surface LS1 of the stored liquid. The liquid detector 110 detects difference in temperature of the liquid that passes through the flow-rate measuring unit 111 in accompaniment with the fluctuation in a level of a liquid surface LS2 of the liquid stored inside the detector, thereby measuring a flow rate of the liquid. Furthermore, the leak detector 110 detects a state of the tank corresponding to the flow rate based on predetermined leakage criteria, thereby determining whether the leakage is occurring.

To calibrate the leak detector 110, a ventilating path 112a is closed off by sealing or other method to stop the flow of gas between an interior of the tank 100 and an interior of the leak detector 110 and to stop the fluctuation in the level of the liquid inside the leak detector 110. This is done because, when the ventilating path 112a, formed in the cap 112, is in communication with the interior and an exterior of the leak detector 110, the level of the liquid surface LS2 becomes equal to the level of the liquid surface LS1 of the interior of the tank 100. When the fluctuation in the level of the liquid inside the leak detector 110 is stopped, the flow-rate measuring unit 111 detects the difference in temperature of the liquid that stays inside the detector, and a reference value for a liquid-flow-rate computing process is obtained. The leak detector 110 is calibrated based on this reference value.

The present applicant has proposed a leak detector in which a solenoid valve is installed at an upper portion of the leak detector. This solenoid valve is used to close off a small hole, which allows communication of gas between the interior of the detector and the interior of a tank, for a predetermined time to stop the fluctuation in the level of the liquid inside the detector (Japanese Patent Application No. 2002-010148).

However, when a tank that is installed above ground or underground is heated by sunlight or the like directly or through the ground, the top plate or a side plate and the like of the tank undergoes shape deformation due to thermal expansion. In particular, since the liquid surface detecting unit, explained in Japanese Patent Application Laid-Open No. 2000-16500, is fixed to the top plate of the tank, when the top plate undergoes shape deformation, the liquid surface detecting unit is moved along with the top cover. The position of the liquid surface detecting unit with respect to the liquid surface is thus changed greatly. As with the case of heating by sunlight or the like, when the tank that is installed above ground or underground is cooled by rain, snow, or the like, the position of the liquid surface detecting unit with respect to the liquid surface is also changed greatly due to thermal contraction of the tank.

For example, a result shown in FIG. 18 was obtained when the liquid surface detecting unit is fixed to a top plate of tank that is located above ground and that has no leakage of liquid, to detect a liquid-level fluctuation rate of the liquid stored in the tank. In the example shown in FIG. 18, the level fluctuation rate was detected over a period of 12 hours, and during this time, the weather was cloudy and then rainy, and a thunderstorm occurred between the time t1 and the time t2. The level fluctuation rate changed significantly between the time t1 and the time t2 as shown in FIG. 18. This occurred because the tank was cooled by the thunderstorm and underwent shape deformation, thereby causing the liquid surface detecting unit to be moved by the top plate and changing the position of the liquid surface detecting unit with respect to the liquid surface. Thus, with a tank, in which the level fluctuation rate is detected using a liquid surface detecting unit fixed to the top plate, the position of the liquid surface detecting unit with respect to the liquid surface often varies with a variation of the environmental temperature. Consequently, it is difficult to detect leakage with high precision based on the fluctuation in the level of the liquid. Erroneous leakage detection thus makes early detection of leakage of a tank difficult and leads to environmental pollution due to leaked liquid.

Meanwhile, when the ventilating path 112a is closed off to calibrate the conventional leak detector 110, the gas inside the leak detector 110 becomes sealed in the space surrounded by the liquid surface LS2 and inner walls of the leak detector 110. In this state, if the tank 100, in which the leak detector 110 is installed, is heated by sunlight or the like, the temperature of the interior of the tank 100 rises and the temperature of the interior of the leak detector 110 also rises. As a result, the gas existing in the interior of the leak detector 110 undergoes thermal expansion and increases in volume. The gas inside the leak detector 110 thus pushes down the liquid surface LS2 by the pressure increase and causes the liquid to flow by a minute amount with respect to the flow-rate measuring unit 111. Appropriate calibration of the leak detector is thus made difficult often and the precision of leak detection of the tank 100 is thereby degraded. This causes erroneous leak detection, which makes early detection of leakage of a tank difficult and leads to environmental pollution due to leaked liquid.

When the tank 100, with which the ventilating path 112a of the installed leakage detector 110 is closed, is cooled by rain, snow, or the like, the temperature of the interior of the tank 100 decreases and the gas existing in the respective internal portions of the tank 100 and the leak detector 110 contracts. Thus, inside the leak detector 110, the internal pressure decreases, the liquid surface LS2 becomes raised, and a minute amount of the liquid flows with respect to the flow-rate measuring unit 111. Appropriate calibration of the leak detector 110 is thus made difficult often to cause the same problems as a case in which the pressure of the interior of the leak detector 110 increases.

With the leak detector proposed by the present applicant, the solenoid valve that is installed at the upper portion closes off the small hole, which allows the flow of gas between the interior of the detector and the interior of the tank, to seal off the air inside the detector. Therefore, the same problems due to pressure fluctuations inside the detector can occur with this arrangement as well.

The present invention has been achieved in view of the above circumstances, and it is an object of the present invention to provide a leak detector and a leak detecting system using the same, with which the degradation of the leak detection precision due to variation of the environmental temperature is restrained to enable early detection of liquid leakage in high precision.

DISCLOSURE OF INVENTION

To solve the above problems and to achieve the object, according to the present invention, a leak detector for detecting leakage of liquid stored in a tank based on fluctuation in a level of the liquid includes a liquid inlet/outlet portion through which the liquid flows in and out; a flow-rate measuring unit arranged at an upper end of the liquid inlet/outlet portion and configured to measure an amount of flow occurring along with the fluctuation; and a liquid retaining portion positioned above the flow-rate measuring unit and including a space in which liquid that has flown in through the liquid inlet/outlet portion is retained. A lower end of the leak detector is detachably attached to a bottom plate of the tank, and an upper end of the leak detector is arranged in such a manner that the space of the liquid retaining portion communicates with an interior of the tank, and is supported in a through opening provided in a top plate of the tank in such a manner that the leak detector is movable in a vertical direction.

Moreover, according to the present invention, a leak detector for detecting leakage of liquid stored in a tank based on fluctuation in a level of the liquid includes a liquid retaining portion including a space configured to retain liquid being a part of the liquid in the tank flown into the leak detector; a flow path portion through which the space of the liquid retaining portion in communicates with an interior of the tank and through which the liquid flows in and out of the leak detector along with the fluctuation; a flow-path opening/closing unit configured to freely open and close at least one end of the flow path portion; a flow-rate measuring unit configured to measure an amount of liquid flowing inside the flow path portion; and a calibrating unit configured to calibrate the flow-rate measuring unit.

Furthermore, according to the present invention, a leak detector for detecting leakage of liquid stored in a tank based on fluctuation in a level of the liquid includes a liquid retaining portion including a space in which liquid being a part of the liquid in the tank flown therein is retained; a flow path portion through which the liquid flows between the space of the liquid retaining portion and an inside of the tank along with the fluctuation; a flow path opening/closing unit configured to freely open and close at least one end of the flow path portion; a flow-rate measuring unit configured to measure an amount of the liquid flowing inside the flow path portion; and a calibrating unit configured to calibrate the flow-rate measuring unit. A lower end of the leak detector is detachably arrested to a bottom plate of the tank, and an upper end of the leak detector is configured such that the space of the liquid retaining portion is in communication with an interior of the tank, and is supported in a through opening provided in a top plate of the tank in such a manner that the leak detector is movable in a vertical direction.

Moreover, in the above invention according to the present invention, the lower end of the leak detector is detachably arrested to the bottom plate of the tank with a magnet.

Furthermore, in the above invention according to the present invention, the upper end of the leak detector is supported in the through opening through an elastic member.

Moreover, in the above invention according to the present invention, the flow-rate measuring unit includes at least one temperature detecting unit configured to detect temperature of liquid inside the flow path portion; a heating unit configured to heat the liquid inside the flow path portion; and a controlling unit configured to control heating temperature of the heating unit for heating the liquid so that the temperature of liquid inside the liquid retaining portion and the temperature of the liquid inside the flow path portion become equal.

Furthermore, in the above invention according to the present invention, the calibrating unit calibrates the flow-rate measuring unit based on an output signal corresponding to temperature of liquid being inside the flow path portion without flowing.

Moreover, in the above invention according to the present invention, the leak detector further includes a protective member configured to protect the flow-rate measuring unit and the liquid retaining portion from the liquid, and arranged outside the flow-rate measuring unit and the liquid retaining portion. The protective member is formed with a metal having a thermal expansion coefficient in a range such that a distance between the flow-rate measuring unit and the bottom plate is maintained invariant.

Furthermore, in the above invention according to the present invention, the protective member is formed with a material identical to a material of the tank.

Moreover, in the above invention according to the present invention, the leak detector further includes an intermediate member arranged between the leak detector and the bottom plate, and formed with a magnetic material.

Furthermore, in the above invention according to the present invention, the flow-rate measuring unit includes a flow path portion for the liquid arranged between the space of the liquid retaining portion and the liquid inlet/outlet portion; at least one temperature detecting unit configured to detect temperature of liquid inside the flow path portion; a heating unit configured to heat the liquid inside the flow path portion; and a controlling unit configured to control heating temperature of the heating unit for heating the liquid so that the temperature of liquid inside the liquid retaining portion and the temperature of the liquid inside the flow path portion become equal.

Moreover, in the above invention according to the present invention, the flow path opening/closing unit includes a solenoid valve and is configured to open and close at least one end of the flow path portion.

Furthermore, according to the present invention, a leak detecting system includes a leak detector configured to detect leakage of liquid stored in a tank based on fluctuation in a level of the liquid; and a controller configured to control driving of the leak detector. The leak detector includes a liquid inlet/outlet portion through which the liquid flows in and out; a flow-rate measuring unit arranged at an upper end of the liquid inlet/outlet portion and configured to measure an amount of flow occurring along with the fluctuation; and a liquid retaining portion positioned above the flow-rate measuring unit and including a space in which liquid that has flown in through the liquid inlet/outlet portion is retained. A lower end of the leak detector is detachably arrested to a bottom plate of the tank, and an upper end of the leak detector is arranged in such a manner that the space of the liquid retaining portion communicates with an interior of the tank, and is supported in a through opening provided in a top plate of the tank in such a manner that the leak detector is movable in a vertical direction.

Moreover, according to the present invention, a leak detecting system includes a leak detector configured to detect leakage of liquid stored in a tank based on fluctuation in a level of the liquid; and a controller configured to control driving of the leak detector. The leak detector includes a liquid retaining portion including a space configured to retain liquid flown into the leak detector, the liquid flown being a part of the liquid in the tank; a flow path portion through which the space of the liquid retaining portion in communicates with an interior of the tank and through which the liquid flows in and out of the leak detector along with the fluctuation; a flow-path opening/closing unit configured to freely open and close at least one end of the flow path portion; a flow-rate measuring unit configured to measure an amount of liquid flowing inside the flow path portion; and a calibrating unit configured to calibrate the flow-rate measuring unit.

Furthermore, according to the present invention, a leak detecting system includes a leak detector configured to detect leakage of liquid stored in a tank based on fluctuation in a level of the liquid; and a controller configured to control driving of the leak detector. The leak detector includes a liquid retaining portion including a space in which liquid flown therein is retained, the liquid flown being a part of the liquid in the tank; a flow path portion through which the liquid flows between the space of the liquid retaining portion and an inside of the tank along with the fluctuation; a flow path opening/closing unit configured to freely open and close at least one end of the flow path portion; a flow-rate measuring unit configured to measure an amount of the liquid flowing inside the flow path portion; and a calibrating unit configured to calibrate the flow-rate measuring unit. A lower end of the leak detector is detachably arrested to a bottom plate of the tank, and an upper end of the leak detector is configured such that the space of the liquid retaining portion is in communication with an interior of the tank, and is supported in a through opening provided in a top plate of the tank in such a manner that the leak detector is movable in a vertical direction.

BEST MODE(S) FOR CARRYING OUT THE INVENTION

Although the present invention shall now be explained in further detail by way of embodiments of the present invention, the present invention is not limited by the embodiments.

Figure 1:
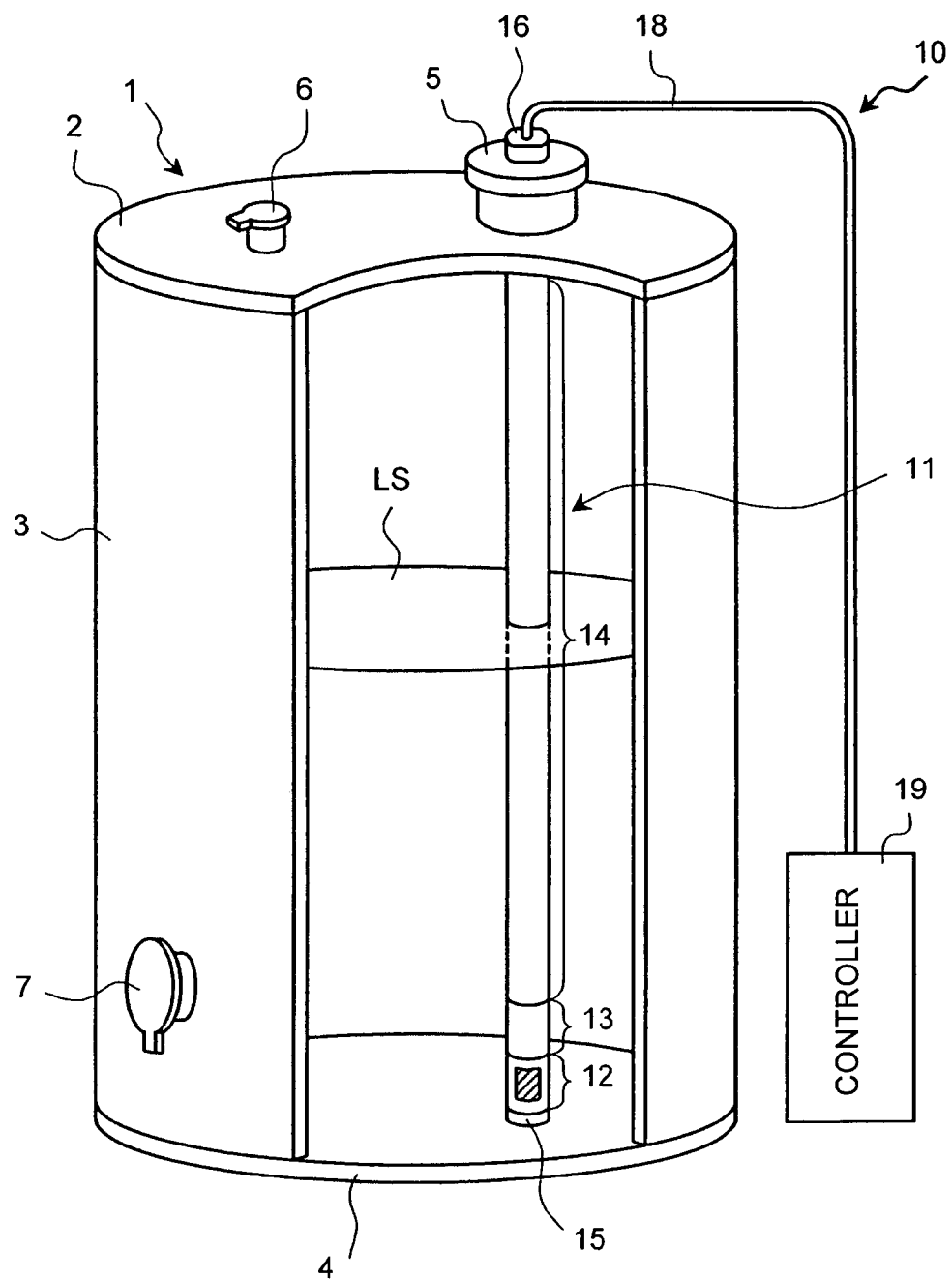
FIG. 1 is schematic partially cut-away view of a tank in which a leak detecting system according to a first embodiment of the present invention is installed.
Figure 2:
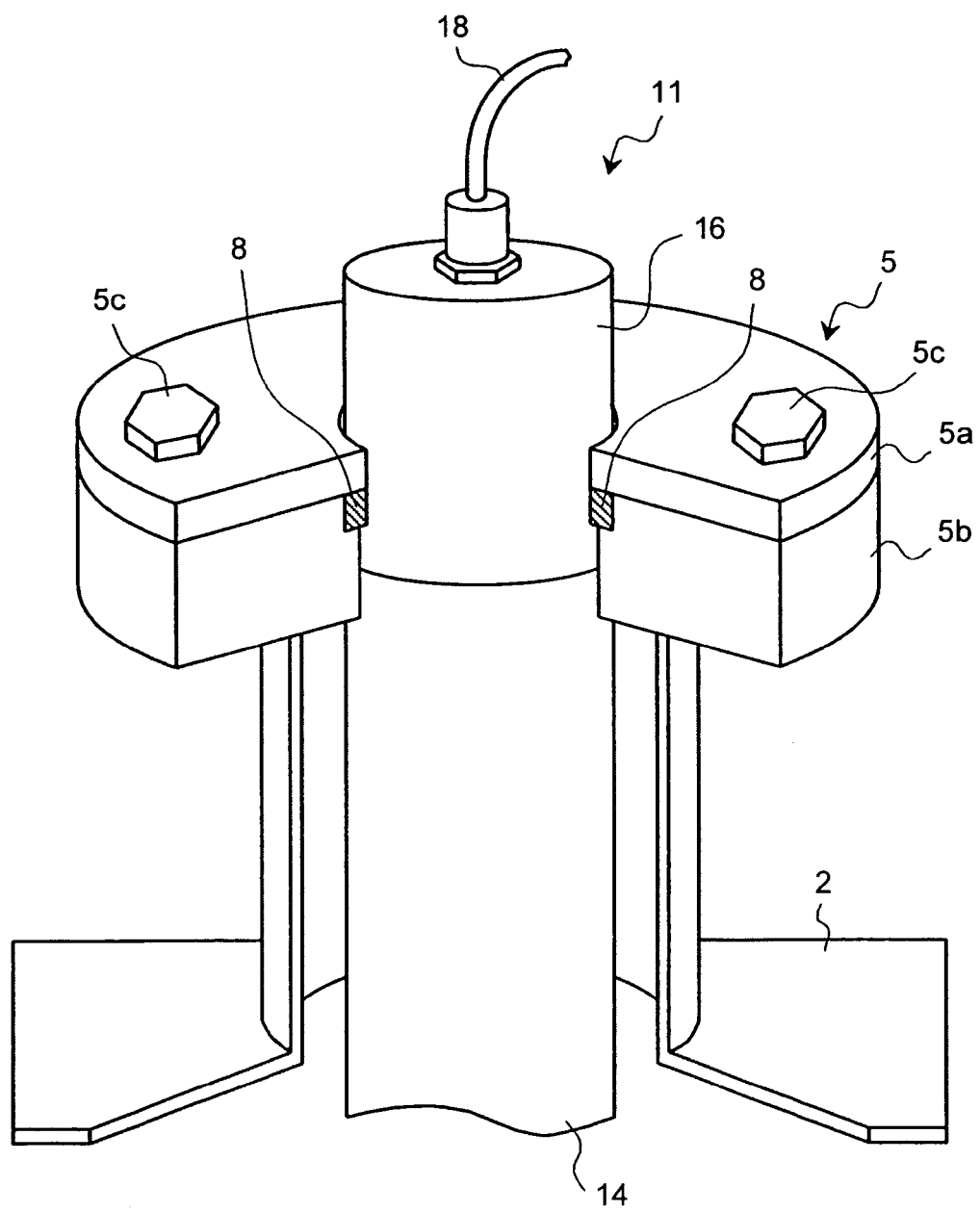
FIG. 2 is a schematic perspective cut-away view of a principal part of the tank for illustrating a support structure of a leak detector according to the first embodiment.
Figure 3:
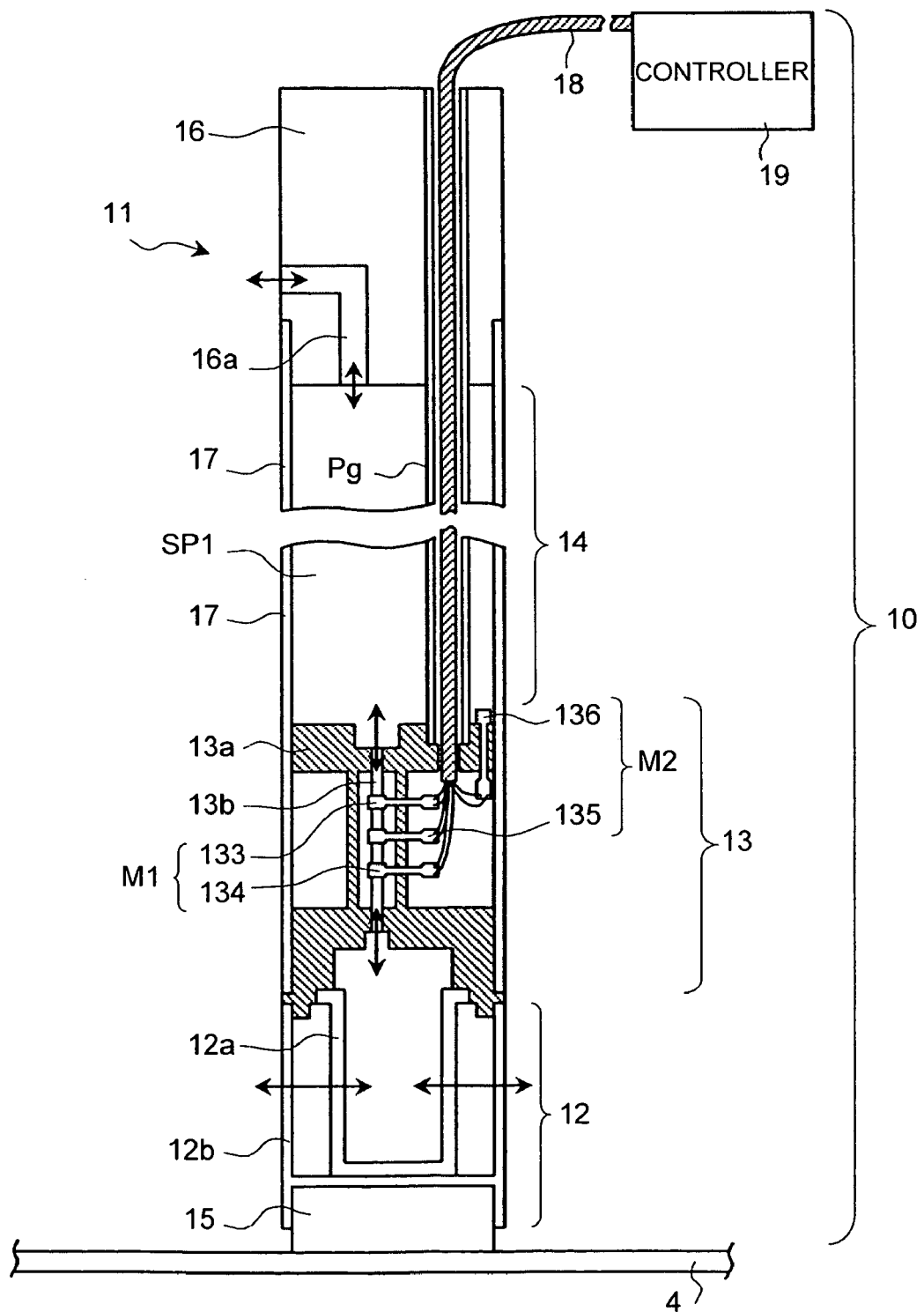
FIG. 3 is a schematic partially-omitted sectional view of an internal structure of the leak detector according to the first embodiment.

First, a leak detector according to a first embodiment and a leak detecting system that includes this detector shall be explained. FIG. 1 is schematic partially cut-away view of a tank in which the leak detecting system according to the first embodiment is installed. FIG. 2 is a schematic perspective cut-away view of a principal part of the tank for illustrating a support structure of the leak detector in the leak detecting system. FIG. 3 is a schematic partially-omitted sectional view of an internal structure of the leak detector.

As shown in FIG. 1, the leak detecting system 10 has the leak detector 11 and a controller 19. The controller 19 is electrically connected via a wiring 18 to a flow-rate measuring unit 13 of the leak detector 11 and is installed at a desired position outside a tank 1. As shown in FIG. 3, the wiring 18 is positioned inside a guide pipe Pg, which is disposed so as to pass through from the flow-rate measuring unit 13 to a cap 16, and is thereby protected against corrosion due to liquid, and the like. A material of the guide pipe Pg may be any kind of metal having a thermal expansion coefficient approximating that of a material of the tank 1 and is preferably the same metal as the material of the tank 1, such as cast iron or stainless steel.

The tank 1 includes a top plate 2 having a gauging port 5 and an inlet 6, a side plate 3 having an outlet 7, and a bottom plate 4, and is formed with members made of cast iron, stainless steel, or other magnetic metal. The leak detector 11 can thus be detachably arrested at its lower end to the bottom plate 4 of the tank 1 with a bottom attaching portion, such as a magnet 15 and can yet be removed readily from the bottom plate 4.

As shown in FIG. 1 to FIG. 3, the leak detector 11 is positioned vertically inside the tank 1 and includes a liquid inlet/outlet portion 12, the flow-rate measuring unit 13, a liquid retaining portion 14, the magnet 15, and the cap 16. The leak detector 11 is passed through the gauging port 5, provided in the top plate 2 of the tank 1, has the liquid inlet/outlet portion, the flow-rate measuring unit 13, and the liquid retaining portion 14 contained in the interior of the tank 1, and has its lower end arrested to the bottom plate 4 of the tank 1 by the bottom attaching portion (the magnet 15). The leak detector 11 also has a top assembly, such as cap 16, at the upper end supported on the gauging port 5. Here, the leak detector 11 is positioned so that the liquid surface LS inside the tank 1 is maintained within the range of the liquid retaining portion 14 and is thus positioned in the tank so that the liquid inlet/outlet portion 12 and the flow-rate measuring unit 13 are sunk in the liquid stored in the tank 1, wherein the flow-rate measuring unit 13 is provided near the bottom end of the leak detector.

As shown in FIG. 2, the cap 16 of leak detector 11 is passed through the gauging port 5 and is supported on the gauging port 5 via an O-ring 8. The O-ring 8 is disposed between a supporting base 5b and a supporting plate 5a that are fixed with bolts 5c. Also, when the cap 16 is supported on the gauging port 5 via the O-ring 8, the O-ring 8 prevents the liquid or gas and the like inside the tank 1 from leaking out from a gap between the gauging port 5 and the cap 16. Being positioned at the gauging port 5 via the O-ring 8, the leak detector 11 is supported at the cap 16 in such a manner that the upper end of the leak detector 11 is freely movable in a vertical direction with respect to the top plate 2.

Thus, even when the gauging port 5 becomes displaced due to a shape variation of the top plate 2 that accompanies a variation of the environmental temperature, since the lower end of the leak detector 11 is arrested to the bottom plate 4 of the tank 1 by the magnet 15 while the upper end side freely movable in the vertical direction with respect to the gauging port 5, the distance between the flow-rate measuring unit 13 and the bottom plate 4 of the tank 1 can be maintained invariant.

As shown in FIG. 3, the liquid inlet/outlet portion 12 includes a filter 12a and a filter cover 12b. In the liquid inlet/outlet portion 12, the filter 12a is disposed at a lower end portion of a sensor holder 13a that forms the flow-rate measuring unit 13, and the filter 12a is fixed by the filter cover 12b.

The filter 12a has a membrane with a filtering function and has functions of removing sludge and other foreign matter floating or settling in the liquid inside the tank 1 and making just the liquid flow into the liquid retaining portion 14.

The filter cover 12b has a function of fixing the filter 12a to the lower end portion of the sensor holder 13a and protecting the filter 12a from external forces. The filter cover 12b also has a function of arresting the leak detector 11 onto the bottom plate 4 via the magnet 15. Furthermore, an opening is provided in a side wall of the filter cover 12b and this opening facilitates the flow of liquid between the liquid inlet/outlet portion 12 and the tank 1. The material of the filter cover 12b may be any kind of metal having a thermal expansion coefficient approximating that of the material of the tank 1 and is preferably the same metal as the material of the tank 1, such as cast iron or stainless steel.

The flow-rate measuring unit 13 includes the sensor holder 13a, a measuring capillary 13b, temperature sensors 133, 134, and 136, and an indirectly-heating temperature sensor 135. As shown in FIG. 3, with the flow-rate measuring unit 13, the temperature sensor 136 and a guide pipe Pg are fixed to an upper portion of the sensor holder 13a. The measuring capillary 13b, the temperature sensors 133 and 134, and the indirectly-heating temperature sensor 135 are fixed to the sensor holder 13a. The flow-rate measuring unit 13 has an arrangement in which the temperature sensor 133, the indirectly-heating temperature sensor 135, and the temperature sensor 134 are successively positioned from the liquid retaining portion 14 side at the outer wall surface of the measuring capillary 13b. Specifically, the indirectly-heating temperature sensor 135 is positioned near the center of the measuring capillary 13b and the temperature sensors 133 and 134 are positioned at nearby positions of equal distance from the indirectly-heating temperature sensor 135.

The sensor holder 13a has its lower end fixed to an upper portion of the liquid inlet/outlet portion 12 and has its outer side covered by a sheath pipe 17. The temperature sensors 133 and 134 and the indirectly-heating temperature sensor 135 are thus protected against corrosion due to the liquid, and the like. The material making up the sensor holder 13a or the sheath pipe 17 may be any kind of metal having a thermal expansion coefficient approximating that of the material of the tank 1 and is preferably the same metal as the material of the tank 1, such as cast iron or stainless steel.

The measuring capillary 13b functions as a liquid inflow path or outflow path between the liquid retaining portion 14 and the interior of the tank 1. The cross-sectional area of the measuring capillary 13b must be set sufficiently small in comparison to the cross-sectional area of the sheath pipe 17 and is set at least equal to or less than 1/50, preferably equal to or less than 1/100, and more preferably equal to or less than 1/300 the cross-sectional area of the sheath pipe 19. By the cross-sectional area being set thus, the flow rate of the liquid, which passes through the measuring capillary 13b in accompaniment with a liquid surface fluctuation of the liquid inside the liquid retaining portion 14, can be made large even when the liquid surface fluctuation is minute.

Each of the temperature sensors 133 and 134 has a function of detecting the temperature of the liquid inside the measuring capillary 13b. The indirectly-heating temperature sensor 135 has functions of detecting the temperature of the liquid inside the measuring capillary 13b and heating the liquid inside the measuring capillary 13b so that the temperature of the liquid becomes equal to the temperature of the liquid inside the liquid retaining portion 14. The temperature sensor 136 has a function of detecting the temperature of the liquid inside the liquid retaining portion 14. In comparing the temperature of the liquid inside the measuring capillary 13b and the temperature of the liquid inside the liquid retaining portion 14, the indirectly-heating temperature sensor 135 uses the temperature detected by the temperature sensor 136.

When the temperature sensors 133 and 134 are used in combination, the temperature sensors 133 and 134 detect the liquid temperature at two fixed points in the measuring capillary 13b and the temperature difference data of the respective detected liquid temperatures can be output as an electrical signal. In this case, the controller 19 can obtains the flow rate of the liquid inside the measuring capillary 13b by performing a predetermined computing process on the temperature difference data based on the electrical signals received from the temperature sensors 133 and 134. Thus, by combining the temperature sensors 133 and 134, a dual fixed-point flow-rate measuring unit M1 that detects the difference of liquid temperatures at two fixed points to measure the flow rate of the liquid can be arranged.

When the indirectly-heating temperature sensor 135 and the temperature sensor 136 are used in combination, the indirectly-heating temperature sensor 135 heats the liquid inside the measuring capillary 13b so as to make equal the liquid temperature inside the liquid retaining portion 14, which is detected by the temperature sensor 136, and the liquid temperature inside the measuring capillary 13b, and the heating process data can thereafter be output as an electrical signal. In this case, the controller 19 can obtain the flow rate of the liquid inside the measuring capillary 13b by performing a predetermined computing process on the heating process data based on the electrical signal received from the indirectly-heating temperature sensor 135. Thus, by combining the indirectly-heating temperature sensor 135 and the temperature sensor 136, a constant temperature controlling flow-rate measuring unit M2, which measures the flow rate of the liquid inside the measuring capillary 13b based on the heating process data of controlling heating so as to make the liquid temperature inside the measuring capillary 13b and the liquid temperature inside the liquid retaining portion 14 equal, can be arranged.

The liquid retaining portion 14 is disposed between the flow-rate measuring unit 13 and the cap 16. The liquid retaining portion 14 includes a space SP1 that is covered by the sheath tube 17 and is arranged to retain the liquid, stored in the tank 1, in the space SP1. When the liquid retaining portion 14 retains the liquid inside the tank 1 in the space SP1, the respective liquid surface positions of the liquid inside the liquid retaining portion 14 and the liquid stored in the tank 1 become substantially equal. This is because a ventilating path 16a of the cap 16, to be explained below, allows the space SP1 communicate with the interior of the tank 1. The liquid inside the liquid retaining portion 14 thus flows out to the tank 1 in accompaniment with fluctuations in the liquid surface position thereof. Also, the liquid stored inside the tank 1 flows into the space SP1 inside the liquid retaining portion 14 in accompaniment with fluctuations in the liquid surface position thereof. The inflow or outflow of liquid between the liquid retaining portion 14 and the tank 1 occurs via the measuring capillary 13b of the flow-rate measuring unit 13. A temperature sensor 136, which is fixed to the sensor holder 13a, is exposed at the bottom surface of the interior of the liquid retaining portion 14. The temperature sensor 136 can thus detect the temperature of the liquid inside the liquid retaining portion 14.

The magnet 15 is mounted on a lower end portion of the leak detector 11 in advance and has the function of detachably arresting this lower end portion to the bottom plate 4 of the tank 1. Specifically, the bottom portion of the filter cover 12b and the bottom plate 4 are arrested together by magnetic force via the magnet 15. Here, the cross-sectional shape of the magnet 15 is preferably homologous to the cross-sectional shape of the filter cover 12b and the diameter of the magnet 15 is preferably made as large as possible while being equal to or less than the inner diameter of the filter cover 12b. A known permanent magnet or an electromagnet may be used as the magnet 15. Alternatively, the magnet 15 may instead be disposed in advance at the bottom plate 4 of the tank 1.

The cap 16 is fixed to an upper portion of the sheath pipe 17 and is freely movably supported in the gauging port 5 in a vertical direction. Also, as shown in FIG. 3, the cap 16 is provided with the ventilating path 16a. The ventilating path 16a has one end opening into the tank 1, has the other end being a through opening that opens into the space SP1 of the liquid retaining portion 14 to put the space SP1 and the interior of the tank 1 in communication. The material forming the cap 16 may be any kind of metal having a thermal expansion coefficient approximating that of the material of the tank 1 and is preferably the same metal as the material of the tank 1, such as cast iron or stainless steel.

Figure 4:
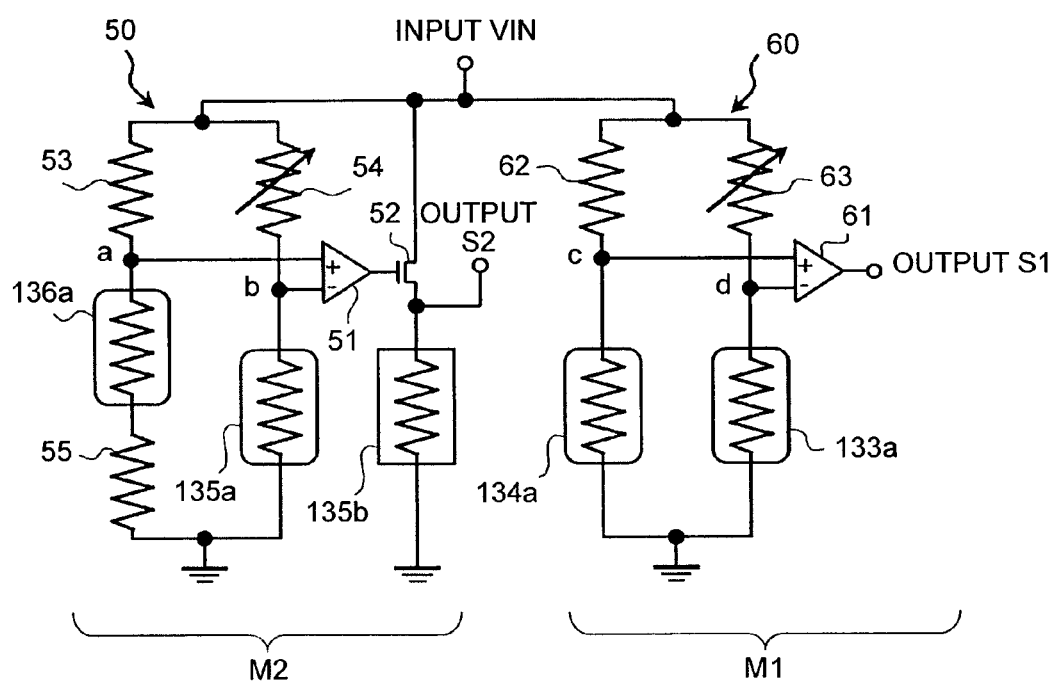
FIG. 4 is a schematic of respective circuit arrangements of a dual fixed-point flow-rate measuring unit and a constant temperature controlling flow-rate measuring unit.

The respective circuit arrangements of the dual fixed-point flow-rate measuring unit M1 and the constant temperature controlling flow-rate measuring unit M2 shall now be explained in detail. FIG. 4 is a schematic of respective circuit arrangements of the dual fixed-point flow-rate measuring unit M1 and the constant temperature controlling flow-rate measuring unit M2. As shown in FIG. 4, the dual fixed-point flow-rate measuring unit M1 includes a detecting circuit 60 and a differential amplifying circuit 61. The detecting circuit 60 is a bridge circuit having a resistor 62, a variable resistor 63, and temperature sensing units 133a and 134a. In the detecting circuit 60, a point c, in the wiring connecting the resistor 62 and the temperature sensing unit 134a, and a point d, in the wiring connecting the variable resistor 63 and the temperature sensing unit 133a, are connected to the differential amplifying circuit 61. The temperature sensing unit 133a is a temperature sensing unit that makes up the temperature sensor 133. The temperature sensing unit 134a is a temperature sensing unit that makes up the temperature sensor 134.

The constant temperature controlling flow-rate measuring unit M2 includes a detecting circuit 50, a differential amplifying circuit 51, a transistor 52, and a heating unit 135b. The detecting circuit 50 is a bridge circuit having resistors 53 and 55, a variable resistor 54, and temperature sensing units 135a and 136a. In the detecting circuit 50, a point a, in the wiring connecting the resistor 53 and the temperature sensing unit 136a, and a point b, in the wiring connecting the variable resistor 54 and the temperature sensing unit 135a, are connected to the differential amplifying circuit 51. The output terminal of the differential amplifying circuit 51 is connected to the control input terminal (gate) of the transistor 52. The output terminal (source) of the transistor 52 is connected to the heating unit 135b. The temperature sensing unit 135a and the heating unit 135b are, respectively, a temperature sensing unit and a heating unit that make up the indirectly-heating temperature sensor 135. The temperature sensing unit 136a is a temperature sensing unit that makes up the temperature sensor 136.

When an input voltage Vin that is input from a power supply circuit (not shown) at a desired time is supplied to the detecting circuit 60, the voltage Vc at the point c and the voltage Vd at the point d of the detecting circuit 60 are input into the differential amplifying circuit 61. The differential amplifying circuit 61 then obtains the voltage difference (Vc−Vd) between the voltage Vc and the voltage Vd and outputs a signal S1, corresponding to this voltage difference (Vc−Vd). The voltage Vc varies in accordance with the temperature detected by the temperature sensing unit 134a. The voltage Vd varies in accordance with the temperature detected by the temperature sensing unit 133a. The voltage difference (Vc−Vd) thus varies in accordance with the difference between the temperature detected by the temperature sensing unit 134a and the temperature detected by the temperature sensing unit 133a. The signal S1 output from the differential amplifying circuit 61 thus corresponds to the difference between the respective temperatures detected by the temperature sensors 133 and 134.

By setting the respective resistance values of the resistor 62 and the variable resistor 63 of the detecting circuit 60 to suitable values in advance, the value of the voltage difference (Vc−Vd) obtained for a desired liquid flow rate of the liquid inside the measuring capillary 13b can be set to a reference value (for example, zero). Also, the voltage output that corresponds to the difference between the liquid temperature inside the measuring capillary 13b, which is detected by the temperature sensor 133, and the liquid temperature inside the measuring capillary 13b, which is detected by the temperature sensor 134, corresponds to the liquid flow rate based on the reference value. The dual fixed-point flow-rate measuring unit M1 can thus output the signal S1 as the voltage corresponding to the liquid flow rate inside the measuring capillary 13b.

Meanwhile, when the input voltage Vin is supplied to the detecting circuit 50, the voltage Va at the point a and the voltage Vb at the point b of the detecting circuit 50 are input into the differential amplifying circuit 51. Based on the input voltages Va and Vb, the differential amplifying circuit 51 obtains the voltage difference (Va−Vb) between the voltage Va and the voltage Vb and outputs a control signal, corresponding to this voltage difference (Va−Vb), to the gate terminal of the transistor 52. The voltage applied to the heating unit 135b via the transistor 52 is controlled by this control signal. The amount of heat generated by the heating unit 135b is thus controlled. The constant temperature controlling flow-rate measuring unit M2 can thus control the voltage applied to the heating unit 135b using the temperature sensing units 135a and 136a, the differential amplifying circuit 51, and the transistor 52. When the voltage based on this voltage control is applied to the heating unit 135b, the heating unit 135b heats the liquid inside the measuring capillary 13b. Thereafter, the temperature sensing unit 135a detects the temperature of the liquid heated by the heating unit 135b. The constant temperature controlling flow-rate measuring unit M2 can thus perform heating control so that the liquid temperature inside the liquid retaining portion 14 and the liquid temperature inside the measuring capillary 13b will be substantially the same. The constant temperature controlling flow-rate measuring unit M2 outputs this voltage controlled by the control signal, that is, the source voltage of the transistor 52 as a signal S2.

The voltage Va varies in accordance with the temperature detected by the temperature sensing unit 136a. The voltage Vb varies in accordance with the temperature detected by the temperature sensing unit 135a. The voltage difference (Va−Vb) thus varies in accordance with the difference between the temperature detected by the temperature sensing unit 136a and the temperature detected by the temperature sensing unit 135a. The control signal output from the differential amplifying circuit 51 thus corresponds to the difference between the respective temperatures detected by the temperature sensor 136 and the indirectly-heating temperature sensor 135.

For example, when the liquid flow rate inside the measuring capillary 13 increases and the temperature detected by the temperature sensing unit 135a becomes lower than the temperature detected by the temperature sensing unit 136a, the differential amplifying circuit 51 outputs a control signal that reduces the resistance value of the transistor 52 to the gate terminal of the transistor 52. The power that is applied to the heating unit 135b via the transistor 52 is thereby increased and the amount of heat generated by the heating unit 135b increases. In this case, the heating unit 135b heats the liquid inside the measuring capillary 13b. The heating unit 135b continues to heat the liquid inside the measuring capillary 13b until the temperature detected by the temperature sensing unit 135a becomes equal to or more than the temperature detected by the temperature sensing unit 136a.

Meanwhile, when the liquid flow rate inside the measuring capillary 13 decreases and the temperature detected by the temperature sensing unit 135a becomes higher than the temperature detected by the temperature sensing unit 136a, the differential amplifying circuit 51 outputs a control signal that increases the resistance value of the transistor 52 to the gate terminal of the transistor 52. The power that is applied to the heating unit 135b via the transistor 52 is thereby decreased and the amount of heat generated by the heating unit 135b decreases. In this case, the constant temperature controlling flow-rate measuring unit M2 restrains the heating of the liquid inside the measuring capillary 13b by the heating unit 135b. The constant temperature controlling flow-rate measuring unit M2 restrains this heating by the heating unit 135b until the temperature detected by the temperature sensing unit 135a becomes less than the temperature detected by the temperature sensing unit 136a.

By setting the respective resistance values of the resistors 53 and 55 and the variable resistor 54 of the detecting circuit 50 to suitable values in advance, the value of the voltage difference (Va−Vb) obtained for a desired liquid flow rate of the liquid inside the measuring capillary 13b can be set to a reference value (for example, zero). Also, the voltage applied to the heating unit 135b, that is, the source voltage of the transistor 52 corresponds to this liquid flow rate based on the reference value. The constant temperature controlling flow-rate measuring unit M2 can thus output the signal S2 as the voltage corresponding to the liquid flow rate inside the measuring capillary 13b.

The signals S1 and S2 are thereafter input via the wiring 18 into the controller 19. The controller 19 carries out a predetermined computing process based on the received signals S1 and S2 and derives liquid-level fluctuation rates of the liquid stored in the tank 1. Based on the obtained liquid-level fluctuation rates, the controller 19 judges whether liquid is leaking from the tank 1.

Figure 5:
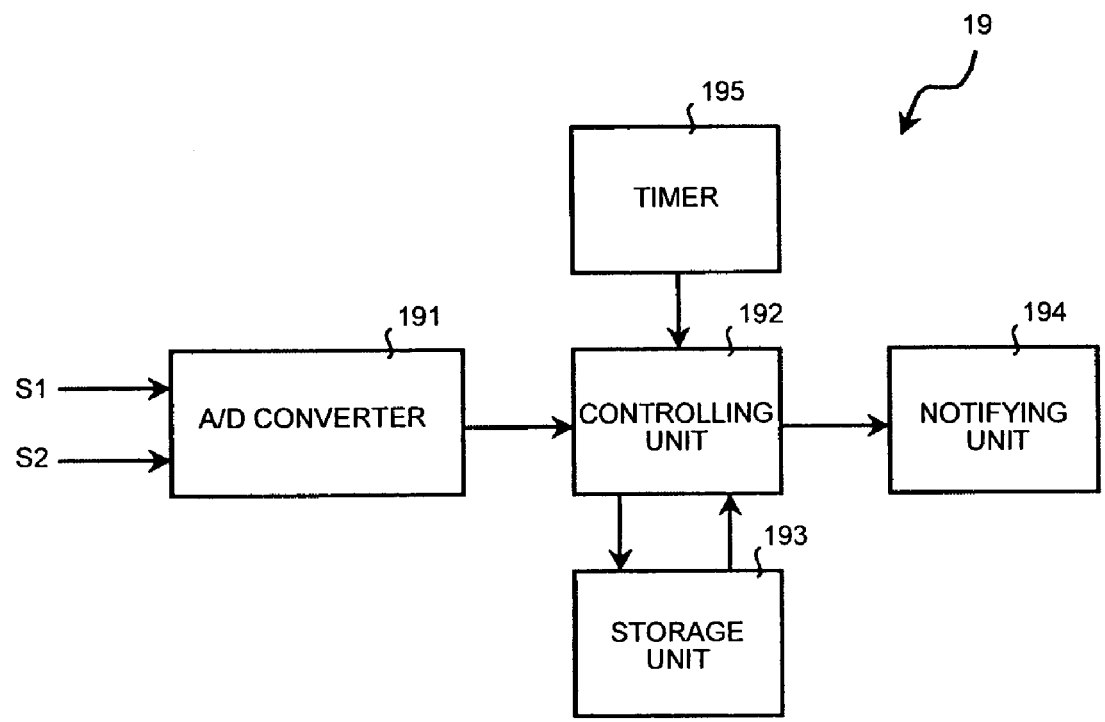
FIG. 5 is a block diagram of a general arrangement of a controller according to the first embodiment.

The arrangement of the controller 19 shall now be explained. FIG. 5 is a block diagram of a general arrangement of the controller 19. As shown in FIG. 5, the controller 19 includes an A/D converter 191, a controlling unit 192, a storage unit 193, a notifying unit 194, and a timer 195.

The A/D converter 191 receives the signal S1 output from the dual fixed-point flow-rate measuring unit M1 and the signal S2 output from the constant temperature controlling flow-rate measuring unit M2 and converts the signals into digital signals, respectively. The A/D converter 191 then sends the respective digital signals to the controlling unit 192. Here, the A/D converter 191 receives the signal S1, output from the dual fixed-point flow-rate measuring unit M1, and the signal S2, output from the constant temperature controlling flow-rate measuring unit M2, via the wiring 18. If the dual fixed-point flow-rate measuring unit M1, the constant temperature controlling flow-rate measuring unit M2, and the A/D converter 191 are provided with wireless communication interfaces, the A/D converter 191 can receive the signals S1 and S2 by wireless communication with the dual fixed-point flow-rate measuring unit M1 and the constant temperature controlling flow-rate measuring unit M2.

The controlling unit 192 is realized using a CPU (central processing unit) that executes various processing programs. The controlling unit 192 has a computational control function of performing, upon receiving the signals S1 and S2, which have been converted into digital signals by the A/D converter 191, a predetermined computing process using the received signals S1 and S2 to obtain the liquid flow rate inside the measuring capillary 13b based on the signal S1 and the liquid flow rate inside the measuring capillary 13b based on the signal S2 and converting the respective liquid flow rates obtained to liquid-level fluctuation rates. The controlling unit 192 also has an alarm control function of using the liquid-level fluctuation rates obtained to judge whether a leakage of liquid is occurring with the tank 1 and outputting an alarm control signal when the tank 1 is judged to be in a leaking state. The controlling unit 192 furthermore has a storage control function of storing the obtained state judgment result of the tank 1 in the storage unit 193 and an information output control function of sending various information, such as the state judgment result, to the notifying unit 194. The controlling unit 192 also performs drive control of the temperature sensors 133, 134, and 136 and the indirectly-heating temperature sensor 135.

The storage unit 193 has a function of storing the state judgment result concerning the tank 1, computing parameters, and other information, which are received from the controlling unit 192, under the control of the controlling unit 192. The controlling unit 192 can read out the various kinds of information stored in the storage unit 193. The storage unit 193 also stores in advance various processing programs by which the controlling unit 192 realizes the respective control functions. Though as the storage unit 193, a ROM (read only memory), storing the various processing programs, and a RAM (random access memory) or other memory enabling the rewriting of the various information may be used in combination, the use of an EEPROM (electronic-erasable-programmable read-only memory) or other rewritable non-volatile memory is preferable. Such types of memory may also be used in combination.

The notifying unit 194 has a function of outputting, based on the alarm control signal received from the controlling unit 192, an alarm that notifies the occurrence of leakage of tank 1, and the like. The notifying unit 194 also has a function of performing, under the control of the controlling unit 192, a display screen output or print output of the information concerning whether a leak is occurring and other various kinds of information received from the controlling unit 192. The alarm output by the notifying unit 194 may be an audio alarm that uses a buzzer, siren, and the like, or an optical alarm that uses a warning lamp, and the like, or a monitor display or other display screen output, or an alarm output that combines such alarms.

The timer 195 has a function of sending, under the control of the controlling unit 192, digital signals that indicate the present date and time, for example, when the controlling unit 192 performs the process of judging whether a leak is occurring. The timer 195 thus functions as a clock that provides time information to the controlling unit 192.

Figure 6:
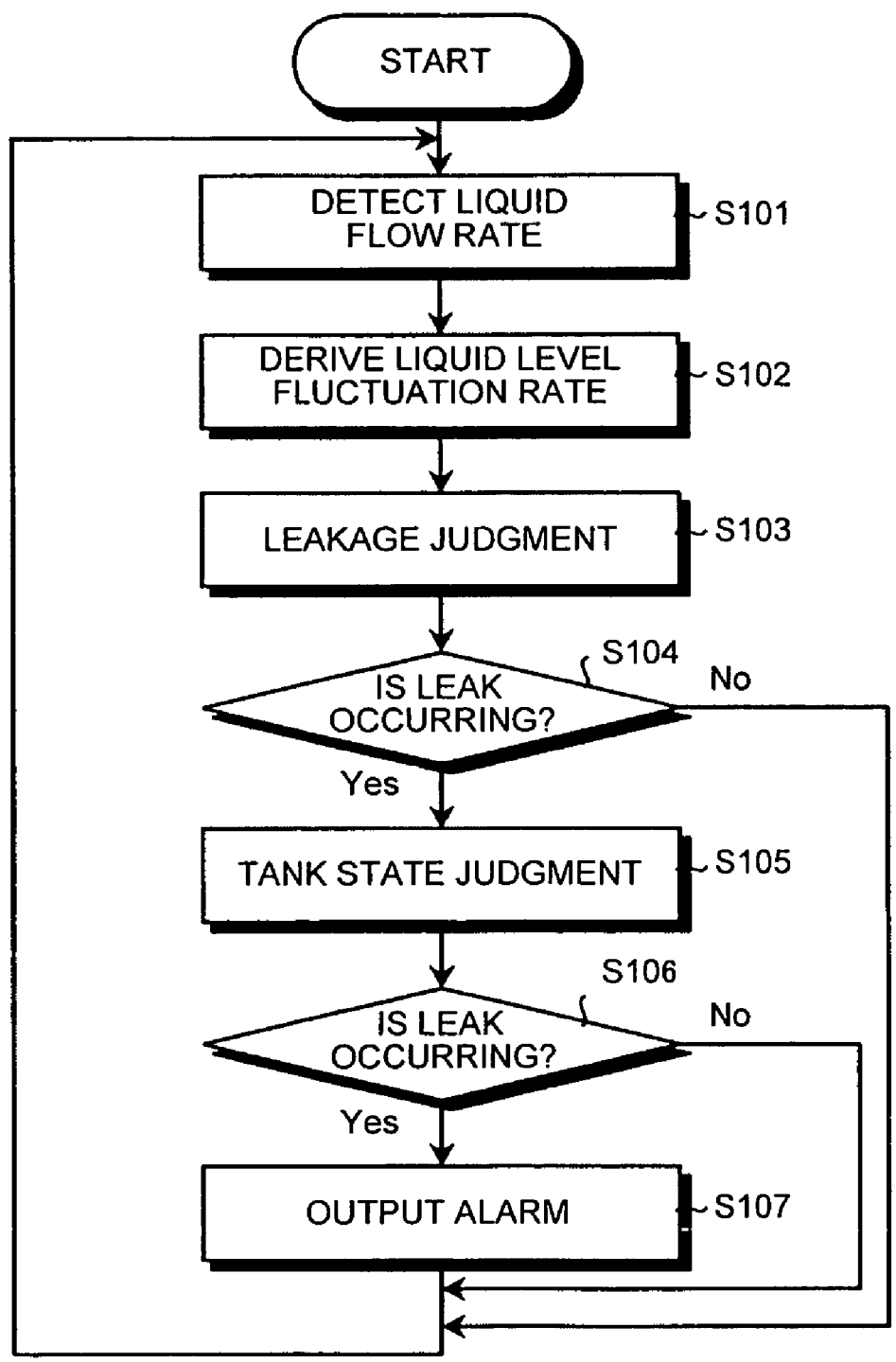
FIG. 6 is a flowchart of a leak detection procedure carried out by the controller according to the first embodiment.

The operations up to the output of the alarm notifying a leaking state, which are performed when the controller 19 in the leak detecting system 10 detects a state of leakage of liquid from the tank 1, shall now be explained in detail. FIG. 6 is a flowchart of the procedures from detection of the liquid flow rates inside the measuring capillary 13b to acquisition of the liquid-level fluctuation rates of the liquid inside the tank 1 based on the acquired liquid flow rates, the subsequent judging of the state of the tank 1, and the outputting of the alarm for notifying the leaking state by the controller 19.

As shown in FIG. 6, when the temperature sensor 133 detects the liquid temperature T1 at the position of measuring capillary 13b shown in FIG. 3 and the temperature sensor 134 detects the liquid temperature T2 at the position of measuring capillary 13b shown in FIG. 3, the dual fixed-point flow-rate measuring unit M1 sends the signal S1, corresponding to the temperature difference (T1−T2) of the temperature T1 and the temperature T2, to the controller 19. Also, when the indirectly-heating temperature sensor 135 detects the liquid temperature T3 at the position of measuring capillary 13b shown in FIG. 3 and the temperature sensor 136 detects the liquid temperature T4 inside the liquid retaining portion 14, the constant temperature controlling flow-rate measuring unit M2 heats the liquid inside the measuring capillary 13b so that the temperature T3 and the temperature T4 become the same and sends the signal S2, corresponding to the applied voltage of the heating process, to the controller 19. The controller 19 receives the signals S1 and S2 from the dual fixed-point flow-rate measuring unit M1 and the constant temperature controlling flow-rate measuring unit M2, respectively, via the wiring 18. The controlling unit 192 performs the predetermined computing process using the signals S1 and S2 to obtain the liquid flow rate P1 based on the signal S1 and the liquid flow rate P2 based on the signal S2. The controller 19 thereby detects the respective liquid flow rates inside the measuring capillary 13b (step S101).

The liquid that flows inside the measuring capillary 13b may be flowing out from the leak detector 11 or may be flowing into the leak detector 11. However, since the controller 19 just needs to detect the fluctuation of the liquid surface inside the liquid retaining portion 14, that is, the fluctuation of the liquid surface inside the tank 1, the direction of the flow of the liquid that flows inside the measuring capillary 13b is not questioned. The liquid flow rates P1 and P2 and the liquid-level fluctuation rates to be explained below are thus handled as positive values.

The controller 19 then uses the liquid flow rates P1 and P2, obtained at step S101 to obtain the liquid-level fluctuation rates F1 and F2, respectively, of the liquid inside the liquid retaining portion 14 (step S102). The liquid flow rates P1 and P2 are the flow rates of the liquid that flows inside the measuring capillary 13 and correspond to the flow rates of liquid that flow between the liquid retaining portion 14 and the liquid inlet/outlet portion 12. Thus, by performing the computing process of dividing the flow rates P1 and P2 by the cross-sectional area of the liquid retaining portion 14, the controlling unit 192 can readily convert the flow rates P1 and P2 to the liquid-level fluctuation rates F1 and F2. The controller 19 can thus obtain the liquid-level fluctuation rates F1 and F2 by this computing process by the controlling unit 192. Since the liquid level inside the liquid retaining portion 14 is the same as the liquid level inside the tank 1, the liquid-level fluctuation rates F1 and F2, obtained at step S102, both correspond to liquid-level fluctuation rates of the liquid inside the tank 1.

The controller 19 then uses the liquid-level fluctuation rate F1, based on the signal S1 received from the dual fixed-point flow-rate measuring unit M1, to perform the leakage judging process of judging whether leakage of liquid is occurring at the tank 1 (step S103). The controlling unit 192 performs this leakage judging process based on leakage criteria corresponding to predetermined liquid-level fluctuation rate ranges that have been set in advance.

When the controlling unit 192 judges that leakage of liquid is occurring at the tank 1 in the leakage judging process of step S103 ("YES" at step S104), the controller 19 uses the liquid-level fluctuation rate F2, based on the signal S2 received from the constant temperature controlling flow-rate measuring unit M2, to perform a tank state judging process of judging among various states concerning the fluctuation of the liquid amount in the tank 1 (step S105). The controlling unit 192 performs the tank state judging process based on tank state criteria corresponding to prescribed liquid-level fluctuation rate ranges that have been set in advance.

If the controlling unit 192 judges the tank 1 to be in a liquid leaking state in the tank state judging process of step S105 ("YES" at step S106), the controller 19 recognizes the tank 1 to be in a liquid leaking state and outputs the alarm that notifies this occurrence of leakage (step S107). Based on the judgment that leakage is occurring in both the leakage judging process and the tank state judging process, the controlling unit 192 recognizes the tank 1 to be in a liquid leaking state and sends the alarm control signal and the time signal, received from the timer 195, to the notifying unit 194. Based on the alarm control signal and the time signal received from the controlling unit 192, the notifying unit 194 outputs the time of occurrence of leakage and an audio, optical, screen display, or other form of alarm that notifies the occurrence of leakage to the exterior. The controlling unit 192 furthermore sends the electrical signal indicating the leakage judgment result and the time signal to the storage unit 193 and makes the information concerning the leakage judgment result and the time of occurrence be stored in the storage unit 193 as tank state versus time information. Thereafter, the controller 19 repeats the processing procedures from step S101 onwards.

On the other hand, if the controlling unit 192 judges that a leakage of liquid is not occurring at the tank 1 in the leakage judging process of step S103 ("NO" at step S104), the controlling unit 192 sends the electrical signal indicating this leakage judgment result and the time signal from the timer 195 to the storage unit 193 and makes the information concerning the leakage judgment result and the time be stored in the storage unit 193 as the tank state versus time information. Thereafter, the controller 19 repeats the processing procedures from step S101 onwards.

Meanwhile, if the controlling unit 192 judges that the tank 1 is in a state in which leakage of liquid is not occurring in the tank state judging process of step S105 ("NO" at step S106), the controlling unit 192 sends the electrical signal indicating this tank state judgment result and the time signal from the timer 195 to the storage unit 193 and makes the information concerning the tank state judgment result and the time be stored in the storage unit 193 as the tank state versus time information. Thereafter, the controller 19 repeats the processing procedures from step S101 onwards.

Figure 7:
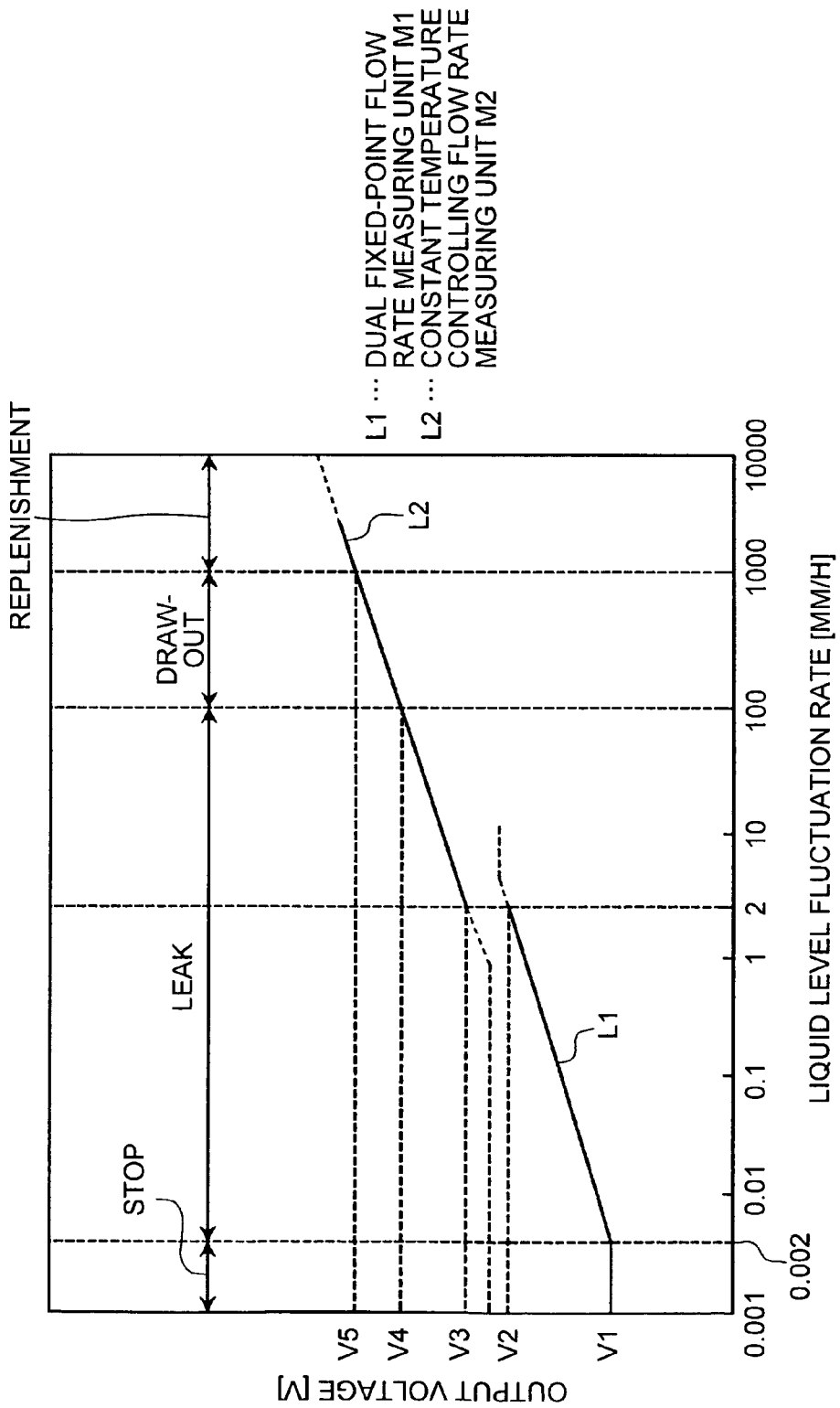
FIG. 7 is a graph for illustrating a relationship between an output voltage and a liquid-level fluctuation rate in the leak detecting system according to the first embodiment.

The leakage judging process of step S103 and the tank state judging process of step S105 shall now be explained more specifically. FIG. 7 is a graph for illustrating a relationship between the output voltage, which is based on the signal S1 or S2 from the dual fixed-point flow-rate measuring unit M1 or the constant temperature controlling flow-rate measuring unit M2, and the liquid-level fluctuation rate inside the tank 1. In FIG. 7, a line L1 indicates the relationship between the output voltage based on the signal S1 from the dual fixed-point flow-rate measuring unit M1 and the liquid-level fluctuation rate inside the tank 1, and a line L2 indicates the relationship between the output voltage based on the signal S2 from the constant temperature controlling flow-rate measuring unit M2 and the liquid-level fluctuation rate inside the tank 1. Since the dual fixed-point flow-rate measuring unit M1 detects ultrafine liquid level fluctuations of the liquid stored in the tank 1, the effective liquid-level fluctuation rate detection range thereof is 0.001 [mm/h] to 2 [mm/h] as shown in FIG. 7. Meanwhile, the constant temperature controlling flow-rate measuring unit M2 can detect liquid level fluctuations of large amounts of the liquid stored in the tank 1 and the effective liquid-level fluctuation rate detection range thereof is 2 [mm/h] to 2000 [mm/h] as shown in FIG. 7.

In FIG. 7, a state wherein the liquid-level fluctuation rate is less than 0.002 [mm/h] is defined as a state (stopped state) wherein there is hardly any liquid level fluctuation of the liquid in the interior, and a state wherein the liquid-level fluctuation rate is in the range of 0.002 [mm/h] to 100 [mm/h] is defined as a state (leaking state) in which the liquid in the interior is leaking to the exterior of the tank 1. Furthermore, a state wherein the liquid-level fluctuation rate is in the range of 100 [mm/h] to 1000 [mm/h] is defined as a state (draw-out state) wherein the liquid level is dropping rapidly due to the drawing out of the liquid from the tank 1, and a state wherein the liquid-level fluctuation rate is no less than 1000 [mm/h] is defined as a state (replenishing state) wherein the liquid level is rising rapidly in accompaniment with the replenishment of liquid into the tank 1.

Furthermore, by appropriately setting the respective resistance values of the resistor 62 and the variable resistor 63 of the dual fixed-point flow-rate measuring unit M1, the output voltage of the signal S1, when the liquid-level fluctuation rate is in the range of 0.001 [mm/h] to 0.002 [mm/h], is set to a voltage V1 [V] and the output voltage of the signal S1, when the liquid-level fluctuation rate is 2 [mm/h], is set to a voltage V2 [V]. In this case, the leakage criteria of step S103 are set so that the judgment that leakage is not occurring (stopped state) is made when the output voltage based on the signal S1 is the voltage V1 [V] and the judgment that leakage is occurring (leaking state) is made when the output voltage based on the signal S1 is between the voltage V1 [V] and the voltage V2 [V]. The leakage criteria are also set so that when the output voltage based on the signal S1 exceeds the voltage V2 [V], the judgment that the tank 1 is in the leaking state is made. However, the liquid surface fluctuation rate in this case is detected based on the signal S2 from the constant temperature controlling flow-rate measuring unit M2.

Furthermore, by appropriately setting the respective resistance values of the resistors 53 and 55 and the variable resistor 54 of the constant temperature controlling flow-rate measuring unit M2, the output voltage of the signal S2, when the liquid-level fluctuation rate is 2 [mm/h], is set to a voltage V3 [V], the output voltage of the signal S2, when the liquid-level fluctuation rate is 100 [mm/h], is set to a voltage V4 [V], and the output voltage of the signal S2, when the liquid-level fluctuation rate is 1000 [mm/h], is set to a voltage V5 [V]. In this case, the tank state criteria of step S105 are set so that the leaking state is judged when the output voltage based on the signal S2 is in the range of the voltage V3 [V] to the voltage V4 [V], so that the draw-out state is judged when the output voltage based on the signal S2 is in the range of the voltage V4 [V] to the voltage V5 [V], and so that the replenishing state is judged when the output voltage based on the signal S2 is equal to or more than the voltage V5 [V]. The tank state criteria are also set so that when the output voltage based on the signal S2 is less than the voltage V3 [V], the output voltage is deemed to be outside the detection range of the constant temperature controlling flow-rate measuring unit M2 and the leakage criteria are used instead.

For example, when the controlling unit 192 receives the signals Si and S2 from the dual fixed-point flow-rate measuring unit M1 and the constant temperature controlling flow-rate measuring unit M2, respectively, and the output voltage based on the signal S1 is the voltage V1 [V], the controlling unit 192 performs the leakage judging process based on the leakage criteria and judges the tank 1 to be in the stopped state as indicated by the line L1 in FIG. 7. In this case, the output voltage based on the signal S2 is less than the voltage V3 [V] and thus outside the detection range of the constant temperature controlling flow-rate measuring unit M2. The controlling unit 192 thus judges the tank 1 to be in the stopped state based on the leakage criteria.

If the output voltage based on the signal S1 received by the controlling unit 192 is greater than the voltage V1 [V] but equal to or less than the voltage V2 [V], the controlling unit 192 performs the leakage judging process based on the leakage criteria and judges the tank 1 to be in the leaking state as indicated by the line L1 in FIG. 7. When the tank 1 is judged to be in the leaking state by this leakage judging process, the controlling unit 192 performs the tank state judging process based on the tank state criteria. In the present case, the output voltage based on the signal S2 is less than the voltage V3 [V] and thus outside the detection range of the constant temperature controlling flow-rate measuring unit M2. The controlling unit 192 thus judges the tank 1 to be in the leaking state based on the leakage criteria.

If the output voltage based on the signal S1 received by the controlling unit 192 is greater than the voltage V1 [V] and the output voltage based on the signal S2 received by the controlling unit 192 is equal to or more than the voltage V3 and yet less than the voltage V4 [V], the controlling unit 192 performs the leakage judging process based on the leakage criteria and judges the tank 1 to be in the leaking state as indicated by the line L1 in FIG. 7. Thereafter, the controlling unit 192 performs the tank state judging process based on the tank state criteria and judges the tank 1 to be in the leaking state as indicated by the line L2 in FIG. 7. The controlling unit 192 thereby accurately judges the tank 1 to be in the leaking state.

If the output voltage based on the signal S1 received by the controlling unit 192 is greater than the voltage V1 [V] and the output voltage based on the signal S2 received by the controlling unit 192 is equal to or more than the voltage V4 and yet less than the voltage V5 [V], the controlling unit 192 performs the leakage judging process based on the leakage criteria and judges the tank 1 to be in the leaking state as indicated by the line L1 in FIG. 7. Thereafter, the controlling unit 192 performs the tank state judging process based on the tank state criteria and judges the tank 1 to be in the draw-out state as indicated by the line L2 in FIG. 7. In this case, the controlling unit 192 judges the tank 1 to be in the draw-out state based on the tank state criteria.

If the output voltage based on the signal S1 received by the controlling unit 192 is greater than the voltage V1 [V] and the output voltage based on the signal S2 received by the controlling unit 192 is greater than the voltage V5 [V], the controlling unit 192 performs the leakage judging process based on the leakage criteria and judges the tank 1 to be in the leaking state as indicated by the line L1 in FIG. 7. Thereafter, the controlling unit 192 performs the tank state judging process based on the tank state criteria and judges the tank 1 to be in the replenishing state as indicated by the line L2 shown in FIG. 7. In this case, the controlling unit 192 judges the tank 1 to be in the replenishing state based on the tank state criteria.

With this leak detecting system 10, whether the tank 1 is in the stopped state, leaking state, draw-out state, or replenishing state can be judged accurately, the lower end of the liquid inlet/outlet portion 12 of the leak detector 11 is arrested to the bottom plate 4 of the tank 1 via the magnet 15 as shown in FIG. 1, and the upper end portion of the leak detector 11 is supported in a manner that enables it to move freely vertically with respect to the top plate 2 of the tank 1 with the airtightness of the interior of the tank 1 being maintained by the O-ring 8 provided at the gauging port 5 of the tank 1 as shown in FIG. 2. Thus, even if the top plate 2 or the side plate 3 undergoes distortion in accompaniment with a variation of the environmental temperature, the upper end portion, in other words, the cap 16 of the leak detector 11 will slide with respect to the gauging port 5, and since the lower end portion, that is, the liquid inlet/outlet portion 12 of the leak detector 11 will be arrested to the bottom plate 4, the leak detector 11 will not be moved vertically by the distortion of the top plate 2 or the side plate 3. The height of the flow-rate measuring unit 13 with respect to the bottom plate 4 can thus be kept fixed constantly and false leakage detection and other forms of erroneous recognition due to the variation of the height of the flow-rate measuring unit 3 with respect to the bottom plate 4 can be restrained.

Figure 8:
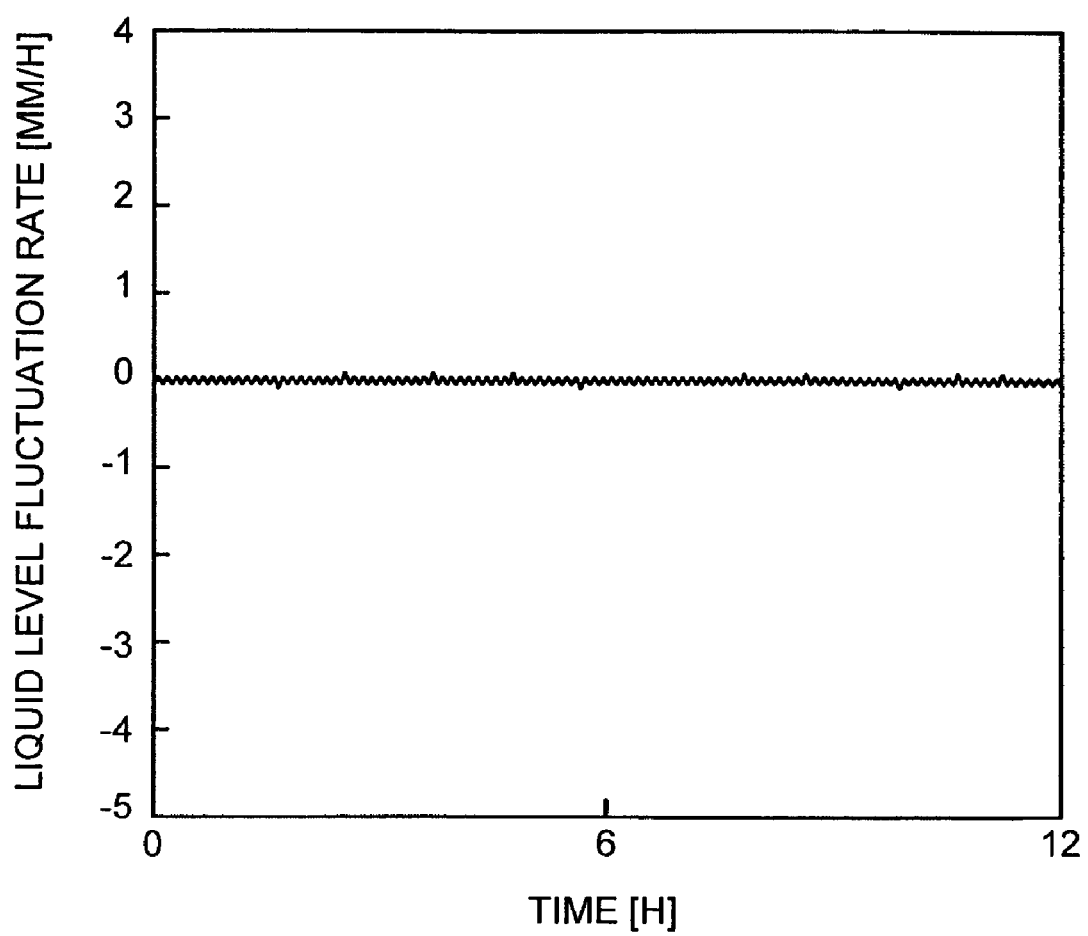
FIG. 8 is a schematic for illustrating a measurement result of variation with time in the liquid-level fluctuation rate inside the tank.

The results of installing the leak detecting system 10 in a tank 1 in which leakage of liquid is not occurring and measuring the variation with time of the liquid-level fluctuation rate of the liquid inside the tank 1 are shown in FIG. 8. As shown in FIG. 8, although the tank 1 was set under an environment in which the environmental temperature varies, that is, a temperature difference of approximately 10 degrees occurs, the liquid-level fluctuation rate was not seen to vary greatly and was stable at substantially close to zero. Thus, with the leak detector 11, the leak detecting system 11, with which false leakage detection and other forms of erroneous recognition, caused by distortions due to expansion and contraction of the tank 1 in accompaniment with variations of the environmental temperature and especially distortions of the top plate 2 and the side plate 3, are restrained and a leak detection process of high precision can be performed, can be realized.

Since the present embodiment has a flow-rate measuring unit, which can measure the liquid flow rate that accompanies the liquid level fluctuation of the liquid stored in a tank, and since the lower end portion of the embodiment is arrested to the bottom plate of the tank by magnetic force while the upper end portion is supported on the gauging port or other portion of the top plate of the tank via an O-ring so that it can move freely vertically, a leak detector can be realized that is not moved vertically by distortions of the top plate or the side plate of the tank or other distortions that occur due to the expansion and shrinkage of the tank in accompaniment with variations of the temperature of the environment in which the tank is installed and thus with which the height of the flow-rate measuring unit with respect to the bottom plate of the tank can be kept fixed constantly and false liquid flow rates, caused by variations of the height of the flow-rate measuring unit with respect to the bottom plate, can be prevented from being measured as non-zero flow rates.

Also, since the present embodiment has this leak detector and a controller, which detects liquid-level fluctuation rates of the liquid inside the tank using the flow-rate measuring unit of the leak detector, detects the leakage of liquid from the tank based on these liquid-level fluctuation rates, and outputs an alarm that notifies the occurrence of the liquid leakage, a leak detecting system can be realized with which false leakage detection and other forms of erroneous recognition due to variations of the height of the flow-rate measuring unit with respect to the bottom plate can be restrained and a leak detection process of high precision can be performed even when distortions of the top plate or the side plate or other distortions occur due to the expansion and shrinkage of the tank in accompaniment with variations of the temperature of the environment in which the tank is installed.

Furthermore, since as the means of detecting the liquid-level fluctuation rates of the liquid stored in the tank, the leak detecting system is equipped with the dual fixed-point flow-rate measuring unit M1, having the temperature sensors 133 and 134, and the constant temperature controlling flow-rate measuring unit M2, having the indirectly-heating temperature sensor 135 and the temperature sensor 136, the system has an effective detection range covering six orders of magnitude from ultramicroscopic liquid level fluctuations to liquid level fluctuations of large amounts inside the tank and can thus constantly perform the tank state judging process based on the liquid level fluctuation inside the tank, accurately judge various states of the tank in relation to liquid amount fluctuations of the stored liquid, and readily perform early detection of the occurrence of leakage.

Also, since in performing the leakage judging process or the tank state judging process in relation to the tank, the leak detecting system does not require preliminary tasks, such as the drawing of the stored liquid, or preliminary work, such as the sealing of the tank, the operation of the tank does not have to be stopped during the period of performing the leakage judging process or the tank state judging process. Economic losses, incurred on the tank-owning operator in the process of performing the leak detecting task on the tank, can thus be reduced.

A second embodiment of the present invention shall now be explained. Whereas with the first embodiment, the lower end portion of the leak detector 11 is detachably arrested to the bottom plate 4 via the magnet 15 as shown in FIG. 3, in the present embodiment, a borer is provided through the magnet 15 at the bottom portion of the liquid inlet/outlet portion 12.

Figure 9:
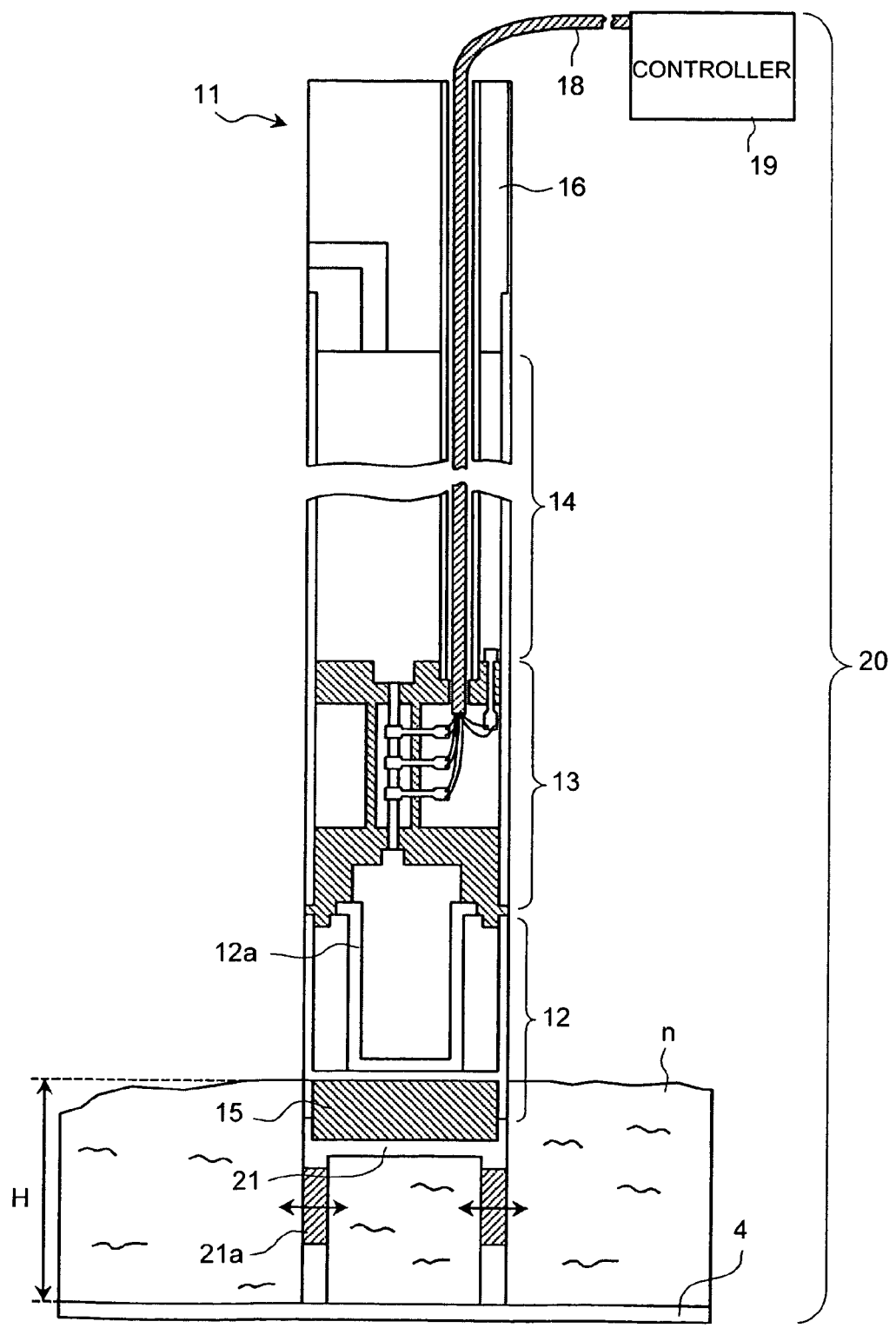
FIG. 9 is a schematic partially-omitted sectional view of a general arrangement of a leak detecting system according to a second embodiment of the present invention.
Figure 10:
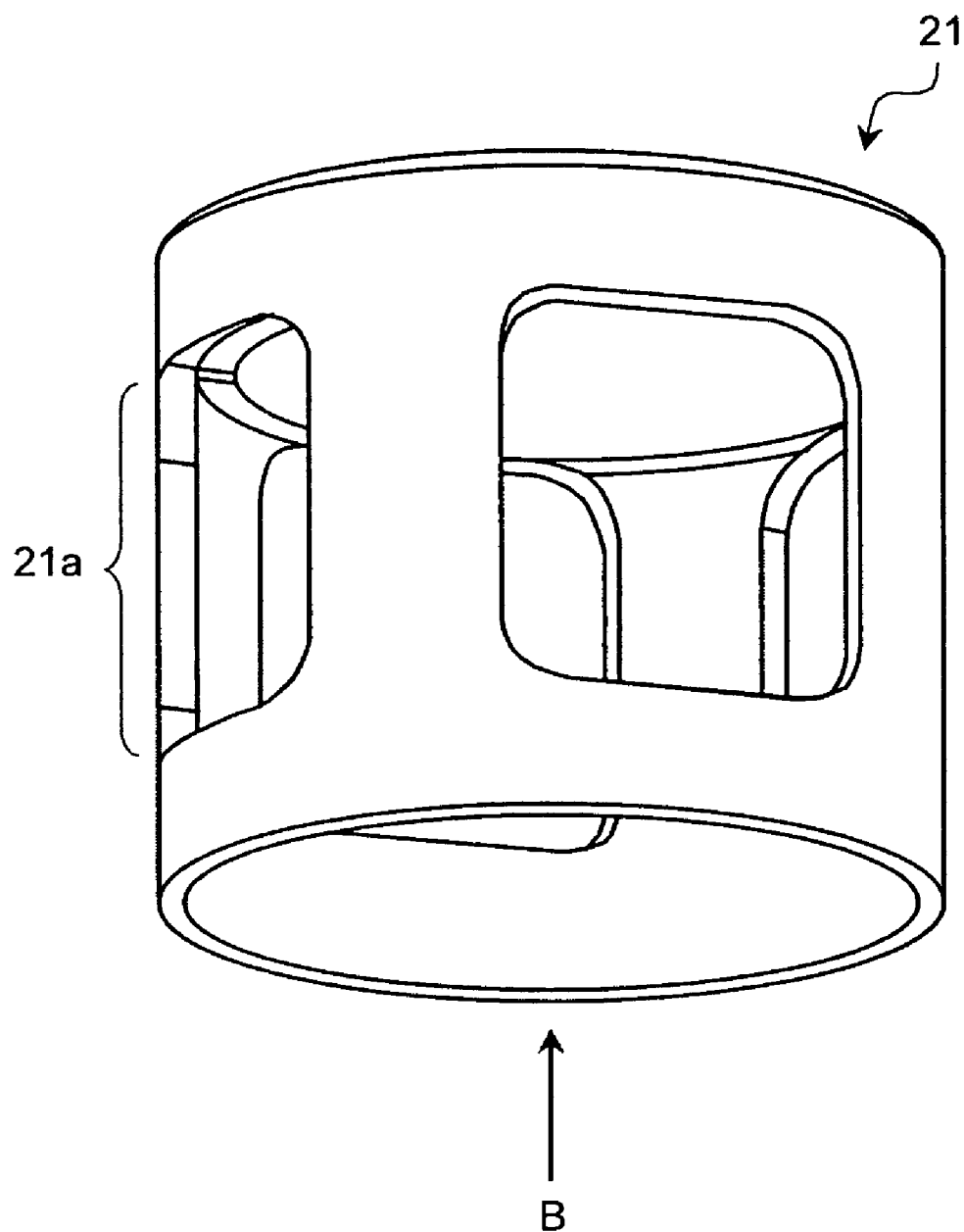
FIG. 10 is a schematic perspective lower view of a structure of a borer.

FIG. 9 is a schematic partially-omitted sectional view of a general arrangement of a leak detecting system according to the second embodiment. In FIG. 9, a state in which this leak detecting system 20 is installed in the tank 1 is illustrated schematically. The leak detecting system 20 furthermore has the borer 21 disposed through the magnet 15 at the lower end portion of the liquid inlet/outlet portion 12. Besides this, the arrangement is the same as that of the first embodiment, and the components that are the same are provided with the same symbols. FIG. 10 is a schematic perspective lower view of a structure of the borer 21.

The borer 21 is realized using a desired magnetic member, and as shown in FIG. 9, arrests the leak detector 11 at its upper portion via the magnet 15. By the borer 21 arresting the leak detector 11 at its upper portion and being fixed to the bottom plate 4 of the tank 1, the leak detector 11 is arrested to the bottom plate 4 of the tank 1 via the magnet 15 and the borer 21.

Also, as shown in FIG. 9 and FIG. 10, the borer 21 has plural openings 21a provided in its side wall. Thus, even when sludge or other foreign matter n is deposited on the bottom of the tank 1, the borer 21 reaches the bottom plate 4 upon pushing the foreign matter n that has entered inside the borer 21 out to the exterior. The borer 21 can thus contact the bottom plate 4 without the foreign matter n becoming sandwiched between the lower portions of the peripheral walls of the borer 21 and the bottom plate 4. Since the borer 21 is realized using a predetermined magnetic material, it is magnetized by the magnet 15. Thus, when the leak detector 11 is arrested via the magnet 15 to its upper portion as shown in FIG. 9, the borer 21 is magnetized by the magnet 15 and becomes magnetically attached to the bottom plate 4. The lower end of the leak detector 11 is thus arrested magnetically to the bottom plate 4 of the tank 1 via the magnet 15 and the borer 21. With this leak detecting system 20, even when foreign matter n is deposited on the bottom of the tank 1, the lower end of the leak detector 11 can be arrested readily to the bottom plate 4 by magnetic force. The borer 21 preferably has a height H so that the filter 12a of the liquid inlet/outlet portion 12 will not become buried in the foreign matter n.

The borer 21 can also prevent the inflow of the foreign matter n into the filter 12a even if the foreign matter n is a liquid that is not to be subject to leakage management. The borer 21 is thus effective in terms of making the stored liquid, which is to be subject to the leakage management, flow between the tank 1 and the leak detector 11.

With the present embodiment, since a borer that uses a magnetic material is equipped across the magnet at the lower end of the leak detector, openings that put the interior and exterior of the borer in communication are provided at the side wall of the borer, and the height of the borer is made higher than foreign matter, such as sludge that has deposited on the bottom plate of the tank or a liquid that is not subject to the leakage management, even when sludge, a liquid that is not subject to the leakage management, or other foreign matter is deposited on the bottom plate of the tank, the lower end of the leak detector can be arrested readily to the bottom plate of the tank and the liquid inlet/outlet portion of the leak detector can be positioned definitely at a position higher than the foreign matter, thereby enabling the realization of a leak detecting process and a leak detecting system, using this process, that provide the actions and effects of the first embodiment and enable restraining of the degradation of the communication of liquid between the tank and the leak detector via the liquid inlet/outlet portion.

A third embodiment of the present invention shall now be explained. While in the first embodiment and the second embodiment, the upper end portion of the leak detector 11 is supported on the gauging port 5 or other portion of the top plate 2 of the tank 1 in a manner such that it can move freely vertically while the lower end portion of the leak detector is arrested detachably to the bottom plate 4 of the tank 1, in the present embodiment, the flow of liquid inside the measuring capillary is made stoppable by the use of a solenoid valve and a process of calibrating the flow-rate measuring unit is performed when the flow of the liquid is stopped.

Figure 11:
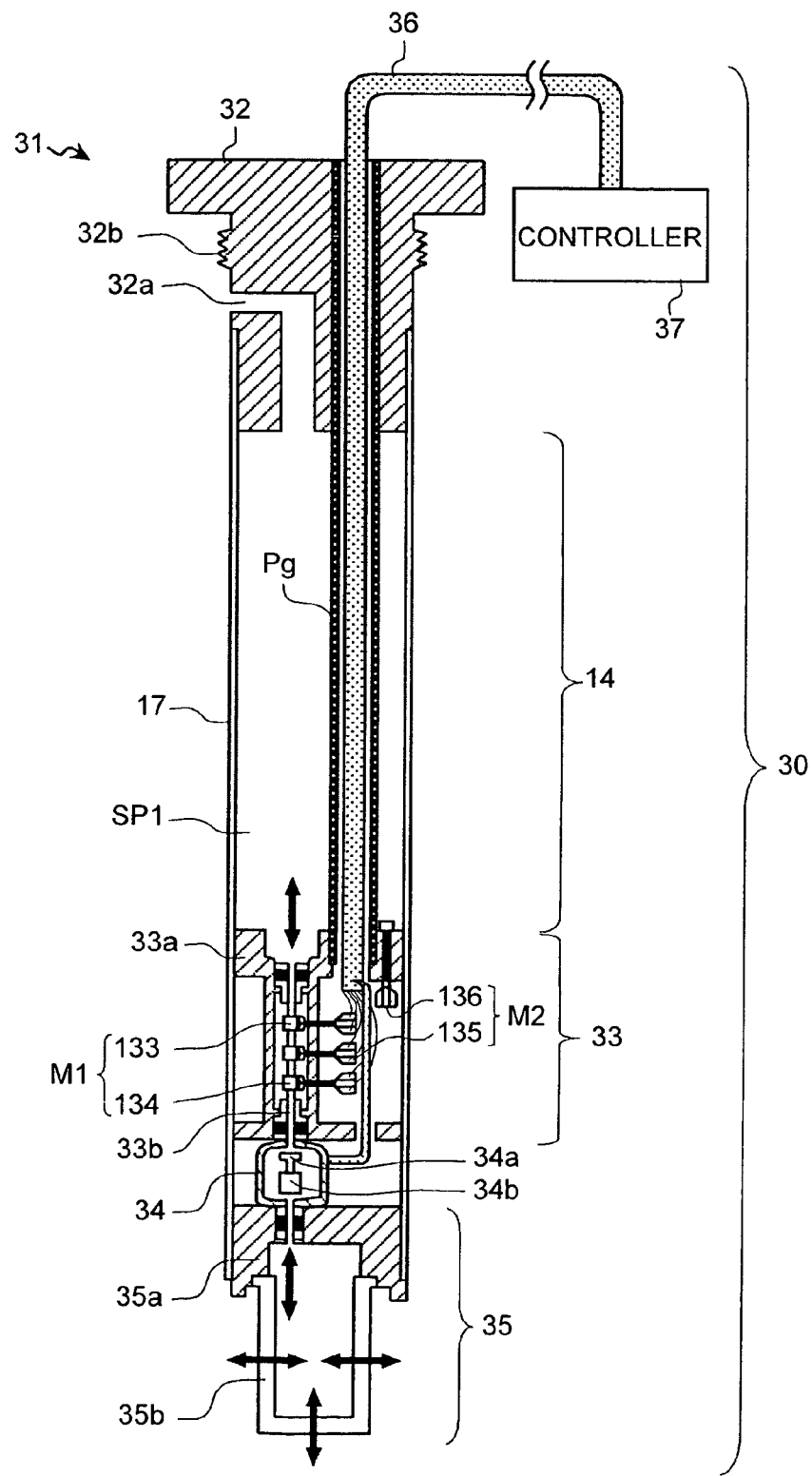
FIG. 11 is a schematic partially-omitted sectional view of a general arrangement of a leak detecting system according to a third embodiment of the present invention.

FIG. 11 is a schematic partially-omitted sectional view of the general arrangement of a leak detecting system according to the third embodiment. This leak detecting system 30 includes a leak detector 31 in place of the leak detector 11 and has a controller 37 in place of the controller 19. The leak detector 31 includes a liquid inlet/outlet portion 35 in place of the liquid inlet/outlet portion 12, a flow-rate measuring unit 33 in place of the flow-rate measuring unit 13, and a cap 32 in place of the cap 16. Furthermore, leak detector 31 includes a solenoid valve 34 disposed between the flow-rate measuring unit 33 and the liquid inlet/outlet portion 35. Controller 37 is electrically connected to the flow-rate measuring unit 33 and the solenoid valve 34 via a wiring 36. The wiring 36 is positioned inside the guide pipe Pg. Besides this, the arrangement is the same as that of the first embodiment and the same components are provided with the same symbols.

The cap 32 is fixed to an upper portion of the sheath pipe 17 and functions as a lid that prevents the entry of foreign matter, and the like, into the liquid retaining portion 14. Also, as shown in FIG. 11, the cap 32 has a ventilating path 32a that puts the interior of the liquid retaining portion 14, that is, the space SP1 in communication with the interior of a tank, and a threaded portion 32b, which is screwed onto the gauging port or other portion of the top plate of the tank. The material forming the cap 32 may be any kind of metal having a thermal expansion coefficient approximating that of the material of the tank in which the leak detector 31 is installed and is preferably the same metal as the material of the tank, such as cast iron or stainless steel.

The flow-rate measuring unit 33 includes a sensor holder 33a, a measuring capillary 33b, the temperature sensors 133, 134, and 136, and the indirectly-heating temperature sensor 135. As shown in FIG. 11, the flow-rate measuring unit 33 has the temperature sensor 136 and the guide pipe Pg fixed to an upper portion of the sensor holder 33a. The measuring capillary 33b, the temperature sensors 133 and 134, and the indirectly-heating temperature sensor 135 are fixed to the sensor holder 33a. The flow-rate measuring unit 33 includes an arrangement wherein the temperature sensor 133, the indirectly-heating temperature sensor 135, and the temperature sensor 134 are successively positioned from the liquid retaining portion 14 side at the outer wall surface of the measuring capillary 33b. Specifically, the indirectly-heating temperature sensor 135 is positioned near the center of the measuring capillary 33b and the temperature sensors 133 and 134 are positioned at nearby positions of equal distance from the indirectly-heating temperature sensor 135.

As shown in FIG. 11, the sensor holder 33a is positioned at the lower end of the liquid retaining portion 14 so as to be covered by the sheath pipe 17. The sensor holder 33a functions as a supporting base that supports the temperature sensors 133, 134, and 136, the indirectly-heating temperature sensor 135, and the measuring capillary 33b and as a protective member that protects these components from corrosion due to immersion in the liquid, etc. The material of the sensor holder 33a may be any kind of metal having a thermal expansion coefficient approximating that of the material of the tank in which the leak detector 31 is installed and is preferably the same metal as the material of the tank, such as cast iron or stainless steel.

The measuring capillary 33*b* is the path that enables liquid to flow between the liquid retaining portion 14 and the solenoid valve 34 and has a function of causing a high liquid-level fluctuation rate in response to a minute liquid level fluctuation of the liquid inside the liquid retaining portion 14. The cross-sectional area of the measuring capillary 33*b* must be set sufficiently small in comparison to the cross-sectional area of the sheath pipe 19 and is set at least equal to or less than 1/50, preferably equal to or less than 1/100, and more preferably equal to or less than 1/300 the cross-sectional area of the sheath pipe 19.

The flow-rate measuring unit 33 uses the temperature sensors 133 and 134 and the indirectly-heating temperature sensor 135 to detect the temperature of the liquid flowing through the interior of the measuring capillary 33*b*. That is, each of the temperature sensors 133 and 134 has a function of detecting the temperature of the liquid inside the measuring capillary 33*b*. The indirectly-heating temperature sensor 135 has functions of detecting the temperature of the liquid inside the measuring capillary 33*b* and heating the liquid inside the measuring capillary 33*b* so that the temperature of this liquid becomes equal to the temperature of the liquid inside the liquid retaining portion 14. The temperature sensor 136 has a function of detecting the temperature of the liquid inside the liquid retaining portion 14. In comparing the temperature of the liquid inside the measuring capillary 33*b* and the temperature of the liquid inside the liquid retaining portion 14, the indirectly-heating temperature sensor 135 uses the temperature detected by the temperature sensor 136.

In substantially the same manner as in the first embodiment, the dual fixed-point flow-rate measuring unit M1, which detects the difference of liquid temperatures at two fixed points in the measuring capillary 33*b* to measure the flow rate of the liquid, can be arranged by the combination of the temperature sensors 133 and 134. Furthermore, in substantially the same manner as in the first embodiment, the constant temperature controlling flow-rate measuring unit M2, which measures the liquid flow rate inside the measuring capillary 33*b* based on the data of the heating process of controlling heating so that the liquid temperature inside the measuring capillary 33*b* will be equal to the liquid temperature inside the liquid retaining portion 14, can be arranged by the combination of the indirectly-heating temperature sensor 135 and the temperature sensor 136.

The solenoid valve 34 is disposed between the flow-rate measuring unit 33 and the liquid inlet/outlet portion 35 and an opening that enables the flow of liquid between the measuring capillary 33*b* and liquid inlet/outlet portion 35 is formed. The solenoid valve 34 includes an opening/closing valve 34*a* that opens and closes this opening, and a driver 34*b* that drives the opening/closing valve 34*a*, and functions as a valve that controls the flow of liquid inside the measuring capillary 33*b*. Here, the driver 34*b* is driven and controlled by the controller 37. The driver 34*b* is electrically connected via the wiring 36 to the controller 37.

The liquid inlet/outlet portion 35 includes a filter holder 35*a* and a filter 35*b*. As shown in FIG. 11, the filter 35*b* is mounted on the filter holder 35*a*. As with the filter 12*a*, the filter 35*b* has the function of preventing sludge and other foreign matter floating or settling inside the tank from entering into the leak detector 31 as well as the function of allowing the liquid inside the tank to flow into the leak detector 31 and the function of allowing the liquid retained inside the liquid retaining portion 14 to flow out of the leak detector 31, that is, into the tank. The flow of liquid between the solenoid valve 34 and the liquid inlet/outlet portion 35 occurs through a through opening formed in the filter holder 35*a*. The material of the filter holder 35*a* may be any kind of metal having a thermal expansion coefficient approximating that of the material of the tank and is preferably the same metal as the material of the tank, such as cast iron or stainless steel.

Figure 12:
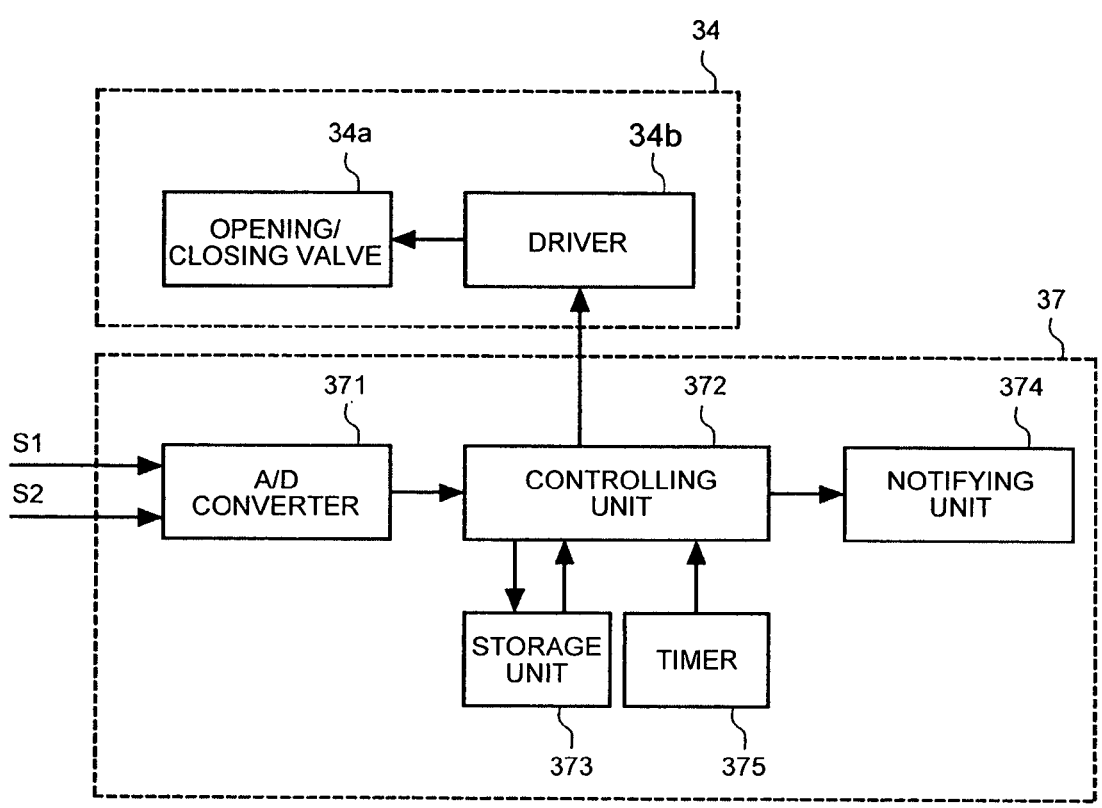
FIG. 12 is a block diagram of a general arrangement of a controller according to the third embodiment.

The arrangement of the controller 37 shall now be explained in detail. FIG. 12 is a block diagram of a general arrangement of the controller 37. As shown in FIG. 12, the controller 37 includes an A/D converter 371, a controlling unit 372, a storage unit 373, a notifying unit 374, and a timer 375. With the solenoid valve 34, the driver 34*b* is electrically connected to the controlling unit 372.

The A/D converter 371 receives the signal S1 output from the dual fixed-point flow-rate measuring unit M1 and the signal S2 output from the constant temperature controlling flow-rate measuring unit M2 and converts the signals into digital signals, respectively. The A/D converter 371 then sends the respective digital signals to the controlling unit 372. The A/D converter 371 receives the signal S1, output from the dual fixed-point flow-rate measuring unit M1, and the signal S2, output from the constant temperature controlling flow-rate measuring unit M2, via the wiring 36. If the dual fixed-point flow-rate measuring unit M1, the constant temperature controlling flow-rate measuring unit M2, and the A/D converter 371 are provided with wireless communication interfaces, the A/D converter 371 can receive the signals S1 and S2 by wireless communication with the dual fixed-point flow-rate measuring unit M1 and the constant temperature controlling flow-rate measuring unit M2.

The controlling unit 372 has substantially the same arrangement and functions as the controlling unit 192. That is, the controlling unit 372 has the computational control functions of performing, upon receiving the signals S1 and S2, which have been converted into digital signals by the A/D converter 371, a predetermined computing process using the received signals S1 and S2 to derive the liquid flow rate inside the measuring capillary 33*b* based on the signal S1 and the liquid flow rate inside the measuring capillary 33*b* based on the signal S2 and converting the respective liquid flow rates obtained to liquid-level fluctuation rates. The controlling unit 372 also has the alarm control function of performing the process of using the liquid-level fluctuation rates obtained to judge whether a leakage of liquid is occurring at the tank and outputting an alarm control signal when the tank is judged to be in a leaking state. The controlling unit 372 furthermore has a storage control function of making the obtained state judgment result of the tank be stored in the storage unit 373 and an information output control function of sending the state judgment result and various kinds of other information to the notifying unit 374. The controlling unit 372 also performs drive control of the temperature sensors 133, 134, and 136 and the indirectly-heating temperature sensor 135.

The controlling unit 372 also performs drive control of the driver 34*b*. That is, in using the leak detector 31 to judge whether a leakage is occurring in the tank, the controlling unit 372 outputs, to the driver 34*b*, a control signal that causes the opening/closing valve 34*a* of the solenoid valve 34 to open. Meanwhile, in calibrating the dual fixed-point flow-rate measuring unit M1 and the constant temperature controlling flow-rate measuring unit M2, the controlling unit 372 outputs, to the driver 34*b*, a control signal that causes the opening/closing valve 34*a* of the solenoid valve 34 to be closed.

The storage unit 373 has the function of storing the tank state judgment result, computing parameters, and various kinds of other information that are received from the controlling unit 372, under the control of the controlling unit 372. The controlling unit 372 can read out the various information stored in the storage unit 373. The storage unit 373 also stores in advance various processing programs for the controlling unit 372 to realize the respective control functions. Though as the storage unit 373, a ROM, storing the various processing programs, and a RAM or other memory enabling the rewriting of the various kinds of information may be used in combination, the use of an EEPROM or other rewritable non-volatile memory is preferable. Such types of memory may also be used in combination.

The notifying unit 374 has the function of outputting, based on the alarm control signal received from the controlling unit 372, an alarm that notifies the occurrence of leakage of tank, and the like. The notifying unit 374 also has a function of performing, under the control of the controlling unit 372, a display screen output or print output of various kinds of other information received from the controlling unit 372, for example, the information concerning whether a leak is occurring or the information concerning the change of the tank state at every desired time. The alarm output by the notifying unit 374 may be an audio alarm using a buzzer, siren, and the like, or an optical alarm using a warning lamp, and the like, or a monitor display or other screen output, or an alarm output that combines such alarms.

The timer 375 has a function of sending, under the control of the controlling unit 372, digital signals that indicate the present date and time, for example, when the controlling unit 372 performs the process of judging whether a leak is occurring. The timer 375 thus functions as a clock that provides time information to the controlling unit 372.

Meanwhile the driver 34b of the solenoid valve 34 has a function of driving the opening/closing valve 34a to open or close in accordance with the control signal received from the controlling unit 372. The driver 34b receives the control signal from the controlling unit 372 by wired communication using the wiring 36 shown in FIG. 11. When the driver 34b and the controlling unit 372 are provided with wireless communication interfaces, the controlling unit 372 can send the control signal to the driver 34b by wireless communication with the driver 34b.

Figure 13:
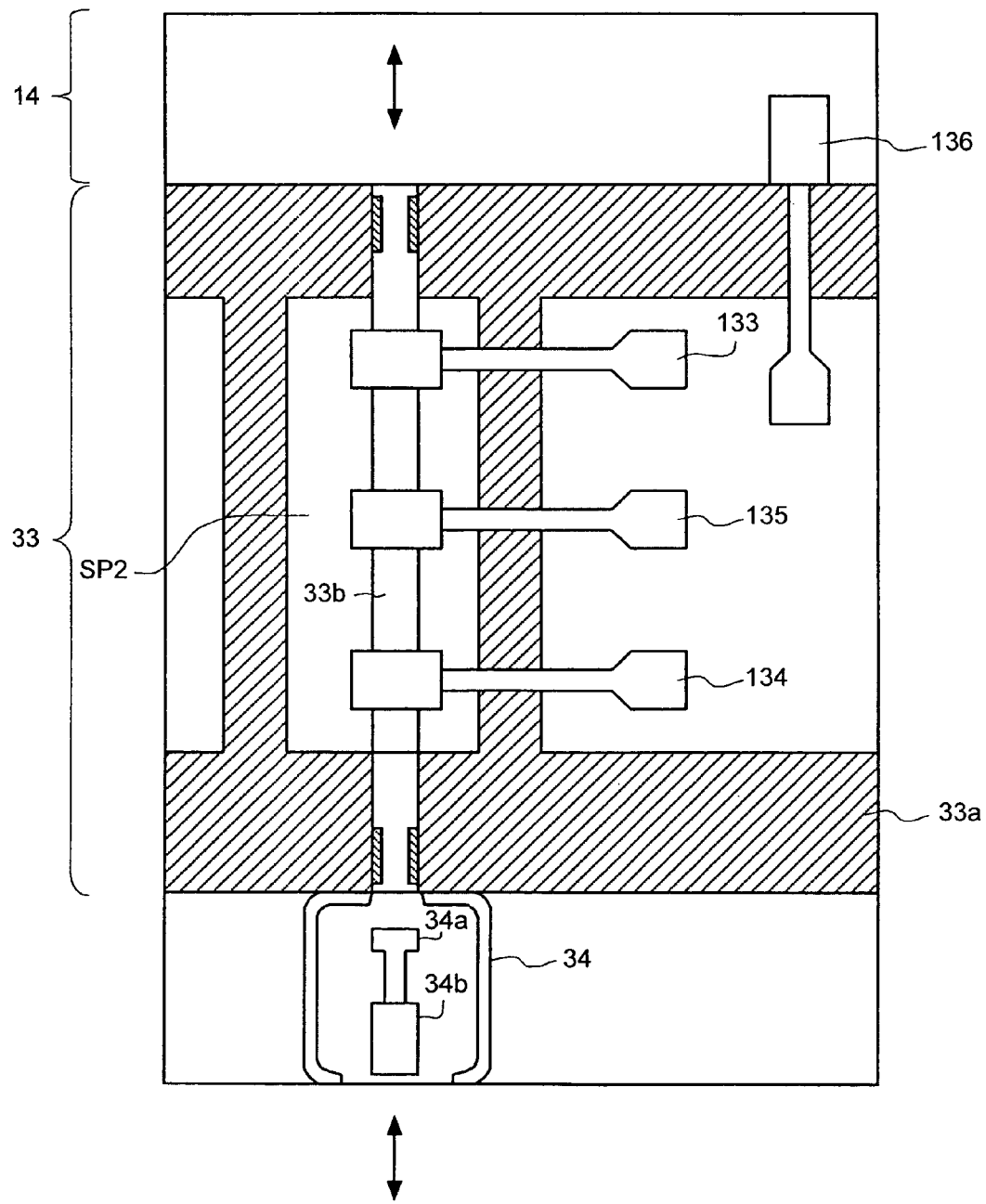
FIG. 13 is a schematic sectional view of a structure near a portion at which a measuring capillary is positioned.

The operations up to the output of the alarm notifying a leaking state, which are performed when the controller 37 in the leak detecting system 30 detects a leakage state of the tank, shall now be explained in detail. FIG. 13 is a schematic sectional view of a structure near the portion at which the measuring capillary 33b of the flow-rate measuring unit 33 is positioned. Besides the flow-rate measuring unit 33, the solenoid valve 34 and the lower end of the liquid retaining portion 14 are illustrated schematically in FIG. 13.

When the controller 37 shown in FIG. 13 judges whether leakage of the tank is occurring using the leak detector 31, the controlling unit 372 sends, to the driver 34b, the control signal that makes the opening/closing valve 34a open. Based on the control signal received from the controlling unit 372, the driver 34b drives the opening/closing valve 34a to open the opening of the solenoid valve 34. The measuring capillary 33b thereby puts the liquid retaining portion 14 and the solenoid valve 34 in communication and enables the flow of liquid between the liquid retaining portion 14 and the solenoid valve 34.

The dual fixed-point flow-rate measuring unit M1 detects the respective liquid temperatures inside the measuring capillary 33b at the respective locations at which the temperature sensors 133 and 134 are positioned and thereafter sends the signal S1, corresponding to the difference of these liquid temperatures, to the controlling unit 372. Also, the constant temperature controlling flow-rate measuring unit M2 detects the respective liquid temperatures at the respective locations at which the indirectly-heating temperature sensor 135 and the temperature sensor 136 are positioned and thereafter sends the signal S2, corresponding to the source voltage of the heating process of the indirectly-heating temperature sensor 135, to the controlling unit 372.

Upon receiving the signals S1 and S2 from the dual fixed-point flow-rate measuring unit M1 and the constant temperature controlling flow-rate measuring unit M2, respectively, the controlling unit 372 performs substantially the same processing procedures as those of steps S101 to S107. That is the controlling unit 372 performs the predetermined computing process using the signals S1 and S2 to derive the liquid flow rate P1 corresponding to the signal Si and the liquid flow rate P2 corresponding to the signal S2. Thereafter, the controlling unit 372 performs the computing process of dividing the obtained flow rates P1 and P2 by the cross-sectional area of the measuring capillary 33b to convert the flow rates P1 and P2 to the liquid-level fluctuation rates F1 and F2 inside the liquid retaining portion 14 of the leak detector 31.

The controlling unit 372 then performs the leakage judging process using the liquid-level fluctuation rate F1 that is based on the signal S1 and thereafter performs, as necessary, the tank state judging process using the liquid-level fluctuation rate F2 that is based on the signal S2. The cap 32 puts the interior of the tank and the interior of the liquid retaining portion 14 in communication by means of the ventilating path 32a and thereby makes equal the air pressures inside the tank and inside the liquid retaining portion 14. The liquid surface position of the liquid inside the tank is thus made equal to the liquid surface position of the liquid inside the liquid retaining portion 14, and the liquid-level fluctuation rate inside the liquid retaining portion 14 is made equal to the liquid-level fluctuation rate inside the tank. The controlling unit 372 can thus judge whether a leakage occurring in the tank by using this liquid-level fluctuation rate, that is, the liquid-level fluctuation rates F1 and F2. The controlling unit 372 can judge the various states (stopped state, leaking state, replenishing state, draw-out state, etc.) of the tank in relation to the fluctuation of the liquid amount by using any one or both of the leakage criteria and the tank state criteria and the liquid-level fluctuation rates F1 and F2 in substantially the same manner as in the first embodiment.

Thereafter, if the controlling unit 372 judges the tank to be in the leaking state, the controlling unit 372 sends the alarm output control signal to the notifying unit 374. Based on the alarm output control signal received from the controlling unit 372, the notifying unit 374 outputs an alarm that notifies this leaking state by sound, light, or any one of various other modes.

When the temperature sensors 133 and 134 and the indirectly heating temperature 135 detect the liquid temperature inside the measuring capillary 33b, the heat generated by the indirectly-heating temperature sensor 135 is transmitted to the temperature sensor 133 by the convection of gas inside a space SP2 that is surrounded by the sensor holder 33a and the measuring capillary 33b. The temperature sensor 133 thus often detects a temperature that is higher than the proper liquid temperature. This causes an error in the liquid-level fluctuation rate F1. The controlling unit 372 thus makes the dual fixed-point flow-rate measuring unit M1 detect the liquid temperature difference inside the measuring capillary 33b when the liquid-level fluctuation rate F1 is of a desired reference value (for example, zero) and makes the dual fixed-point flow-rate measuring unit M1 output the signal S1 corresponding to this liquid temperature difference. Thereafter, the controlling unit 372 uses the output voltage based on this signal S1 as a calibration value and calibrates the dual fixed-point flow-rate measuring unit M1 by making this calibration value be reflected in the process of computing the liquid-level fluctuation rate.

Figure 14:
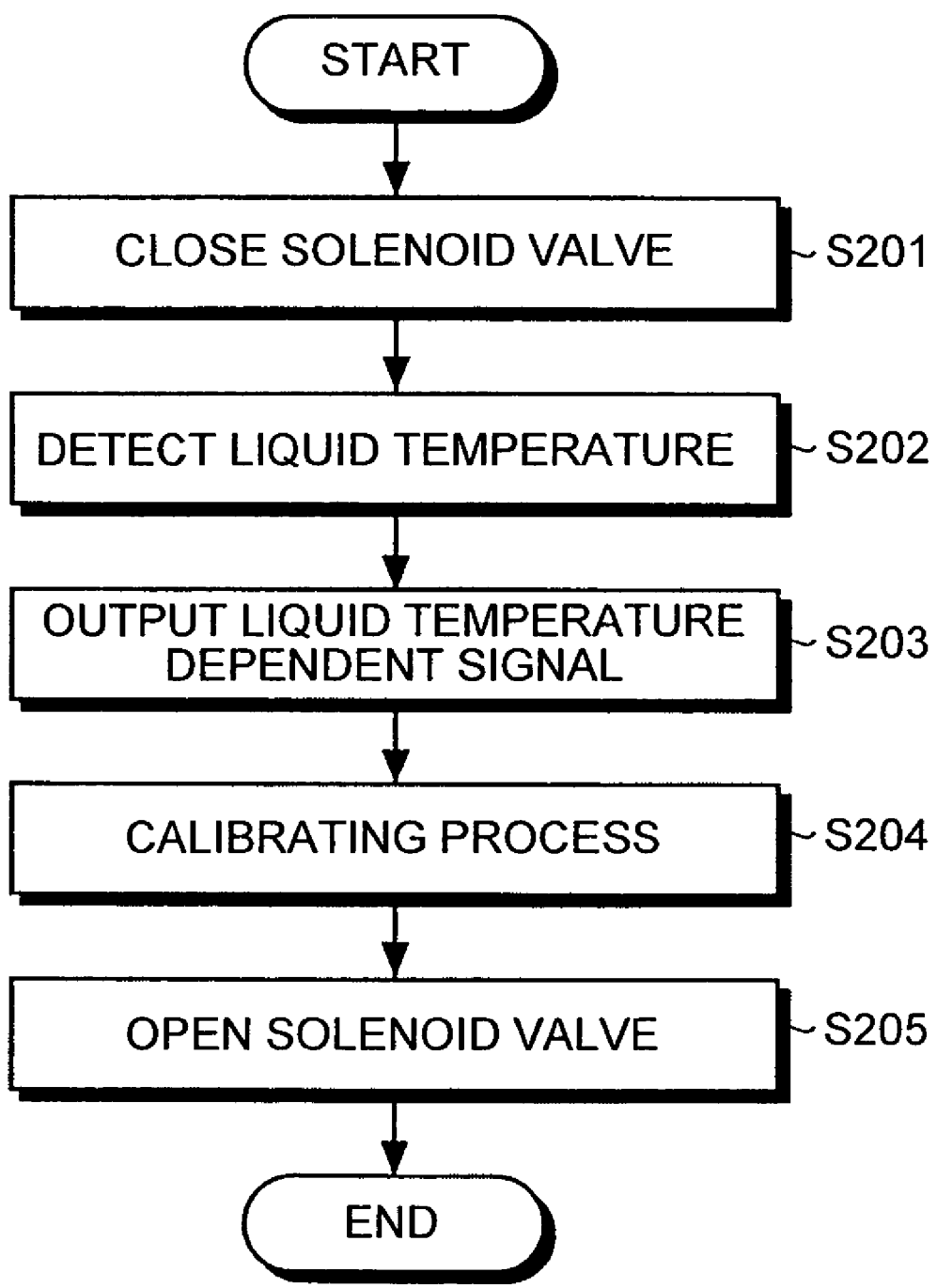
FIG. 14 is a flowchart of a calibration procedure performed by the controller.

FIG. 14 is a flowchart of the procedures from detection of liquid temperatures by the dual fixed-point flow-rate measuring unit M1 and the constant temperature controlling flow-rate measuring unit M2 to calibration of the dual fixed-point flow-rate measuring unit M1 by the controller 37. In FIG. 14, if the controller 37 is to perform the calibration process on the dual fixed-point flow-rate measuring unit M1, the controlling unit 372 sends, to the driver 34b, the control signal that makes the opening/closing valve 34a close and thereby performs drive control of the driver 34b to close the opening/closing valve 34a in regard to the opening of the solenoid valve 34 (step S201). Being driven by the driver 34b, the opening/closing valve 34a closes off the opening of the solenoid valve 34, that is, for example, the lower end of the measuring capillary 33b. The opening/closing valve 34a can thereby directly stop the flow of liquid inside the measuring capillary 33b and make the liquid-level fluctuation rate of this liquid zero.

The indirectly-heating temperature sensor 135, shown in FIG. 13, then detects the temperature of the liquid inside the measuring capillary 33b under the control of the controlling unit 372 and the temperature sensor 136 detects the temperature of the liquid inside the liquid retaining portion 14 under the control of the controlling unit 372. Here, if the liquid temperature detected by the indirectly-heating temperature sensor 135 is lower than the liquid temperature detected by the temperature sensor 136, the heating unit 135b (see FIG. 4) of the indirectly-heating temperature sensor 135 heats the liquid inside the measuring capillary 33b. At substantially the same time, each of the temperature sensors 133 and 134, shown in FIG. 13, detects the temperature of the liquid retained inside the measuring capillary 33b under the control of the controlling unit 372 (step S202). Since the heat from the heating unit 135b is transmitted by convection of the air inside the space SP2, and the like, to the temperature sensor 133, the temperature sensor 133 detects a liquid temperature T3 that is higher than the proper liquid temperature. Meanwhile, the temperature sensor 134 detects a proper liquid temperature T4 of the liquid that is retained inside the measuring capillary 33b.

Thereafter, the dual fixed-point flow-rate measuring unit M1 outputs a signal S0 that corresponds to the voltage difference of the voltage based on the liquid temperature T3 and the voltage based on the liquid temperature T4 (step S203). Since the liquid temperatures T3 and T4 are not the same, the signal S0 has an output voltage V6 that is not zero.

Figure 15:
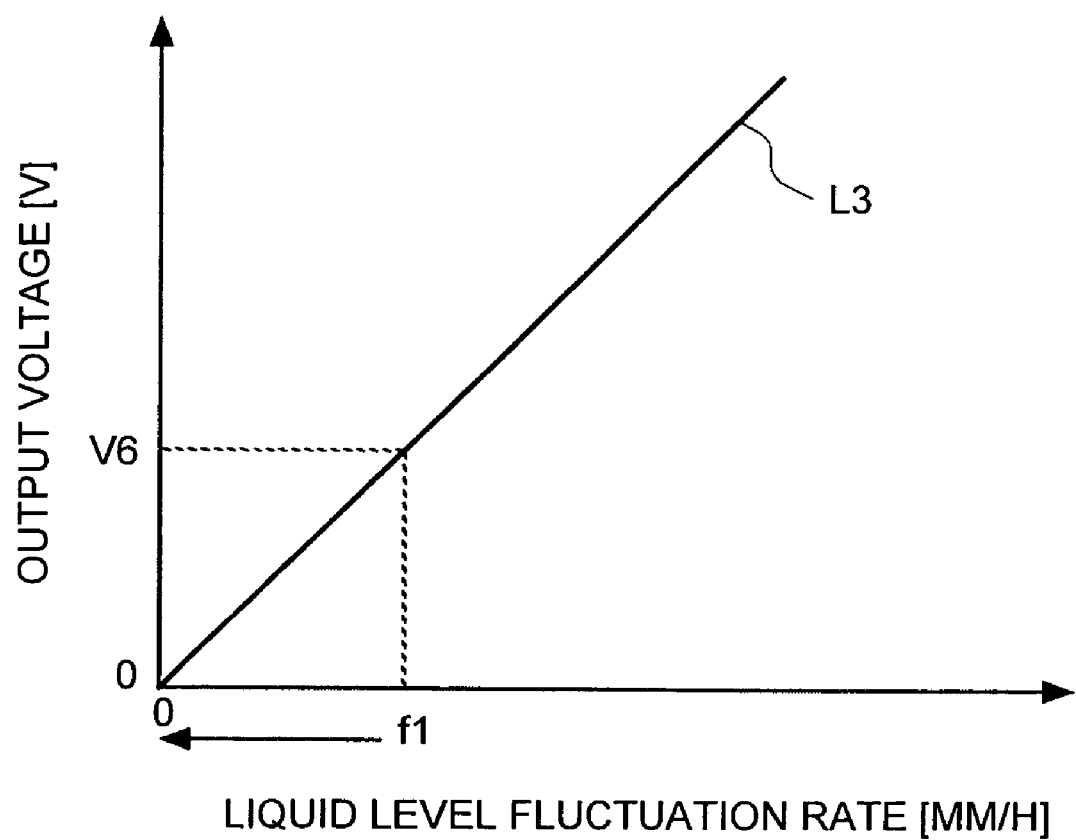
FIG. 15 is a graph for illustrating a relationship between an output voltage from the dual fixed-point flow-rate measuring unit and the liquid-level fluctuation rate.

The controlling unit 372 then receives the signal S0 from the dual fixed-point flow-rate measuring unit M1, and based on an interrelationship, set in advance, between the output voltage and the liquid-level fluctuation rate, derives the liquid-level fluctuation rate corresponding to this signal S0. FIG. 15 is a graph for illustrating the interrelationship between the output voltage, based on the signal output from the dual fixed-point flow-rate measuring unit M1, and the liquid-level fluctuation rate of the liquid retained inside the leak detector 31. In FIG. 15, a line L3 is a reference line that indicates this relationship between the output voltage and the liquid-level fluctuation rate and passes through the point (origin) at which both the liquid-level fluctuation rate and the output voltage are zero. Based on this interrelationship of the output voltage and the liquid-level fluctuation rate of the line L3, the controlling unit 372 derives the liquid-level fluctuation rate corresponding to the signal S0 and thereby obtains a liquid-level fluctuation rate f1 as shown in FIG. 15. Since the signal S0 is the output signal for the case where the liquid inside the measuring capillary 33b is not flowing, the liquid-level fluctuation rate f1 is the error that the dual fixed-point flow-rate measuring unit M1 has. The controlling unit 372 can thus obtain the liquid-level fluctuation rate f1 as the calibration value for calibrating the dual fixed-point flow-rate measuring unit M1. The controlling unit 372 thus controls the computing process so that this calibration value is reflected in the liquid-level fluctuation rate (for example by subtracting the liquid-level fluctuation rate f1) to achieve calibration of the dual fixed-point flow-rate measuring unit M1 (step S204). This calibration value is stored in the storage unit 373 and is renewed each time the calibration process of step S204 is performed.

Thereafter, the controlling unit 372 sends, to the driver 34b, the control signal that makes the opening/closing valve 34a open and performs drive control of the driver 34b to make the opening/closing valve 34a open in regard to the opening of the solenoid valve 34 (step S205). The opening/closing valve 34a opens up the lower end of the measuring capillary 33b by being driven by the driver 34b. The measuring capillary 33b thereby enables flow of liquid between the liquid retaining portion 14 and the solenoid valve 34 and facilitates the flow of liquid between the leak detector 31 and the interior of the tank.

The present embodiment has a flow-rate measuring unit, which makes liquid flow through the liquid retaining portion 14, the measuring capillary 33b, the solenoid valve 34, and the liquid inlet/outlet portion 35 and can measure the liquid flow rate inside the measuring capillary 33b as the liquid flow rate inside the tank with the air pressures inside the liquid retaining portion 14 and inside the tank being made substantially equal constantly and the liquid inside the liquid retaining portion 14 and the liquid inside the tank undergoing liquid level fluctuations in the same manner. In addition, the solenoid valve 34, which can freely open and close the lower end of the measuring capillary 33b or other opening for liquid flow, is used to enable direct stopping of the liquid flow inside the measuring capillary 33b, thus enabling detection of the temperature difference of the liquid inside the measuring capillary 33b when the flow is stopped by the solenoid valve 34. A leak detector can thus be realized with which the liquid flow rate that accompanies the level fluctuation of the liquid inside the tank can be measured and with which, even if the air pressures inside the tank and inside the liquid retaining portion 14 vary in accompaniment with variations of the temperature of the environment in which the tank is installed, the liquid flow within the measuring capillary 33b can be stopped definitely to enable the temperature difference of the liquid inside the measuring capillary 33b when the liquid-level fluctuation rate is zero to be measured definitely.

Also, since this embodiment has this leak detector and a controller, which detects the level fluctuation rate of the liquid inside the tank, detects the leakage of liquid from the tank based on the liquid-level fluctuation rate, outputs an alarm that notifies the occurrence of the liquid leakage, and performs the process of calibrating the flow-rate measuring unit based on the temperature difference of the liquid inside the measuring capillary 33b when the liquid-level fluctuation rate is zero, a leak detecting system can be realized with which even when the air pressures inside the tank and inside the liquid retaining portion 14 vary in accompaniment with the variation of the temperature of the environment in which the tank is installed, the process of calibrating the flow-rate measuring unit can be performed definitely, the measurement error of the liquid flow rate inside the tank can be reduced, and a leakage detection process of high precision can be performed.

Furthermore, since as the means of detecting the liquid-level fluctuation rates of the liquid stored in the tank, the leak detecting system is equipped with the dual fixed-point flow-rate measuring unit M1, having the temperature sensors 133 and 134, and the constant temperature controlling flow-rate measuring unit M2, having the indirectly-heating temperature sensor 135 and the temperature sensor 136, the system has an effective detection range covering six orders of magnitude from ultramicroscopic liquid level fluctuations to liquid level fluctuations of large amounts inside the tank and can thus constantly perform the tank state judging process based on the liquid level fluctuation inside the tank, accurately judge various states of the tank in relation to liquid amount fluctuations of the stored liquid, and readily perform early detection of the occurrence of leakage.

Also, since in performing the leakage judging process or the tank state judging process in relation to the tank, the leak detecting system does not require preliminary tasks, such as the drawing of the stored liquid, and the like, or preliminary work, such as the sealing of the tank, and the like, the operation of the tank does not have to be stopped during the period of performing the leakage judging process or the tank state judging process. Economic losses, incurred on the tank-owning operator in the process of performing the leak detecting task on the tank, can thus be reduced.

A fourth embodiment of the present invention shall now be explained. While in the third embodiment, a solenoid valve is used to enable the flow of liquid within the measuring capillary to be stopped and a process of calibrating the flow-rate measuring unit is performed when the flow of the liquid is stopped, in the present embodiment, in addition to this arrangement, the upper end portion of the leak detector is supported in a manner enabling it to move freely vertically on the gauging port of other portion of the top plate of the tank and the lower end portion of the leak detector is arrested detachably to the bottom plate of the tank.

Figure 16:
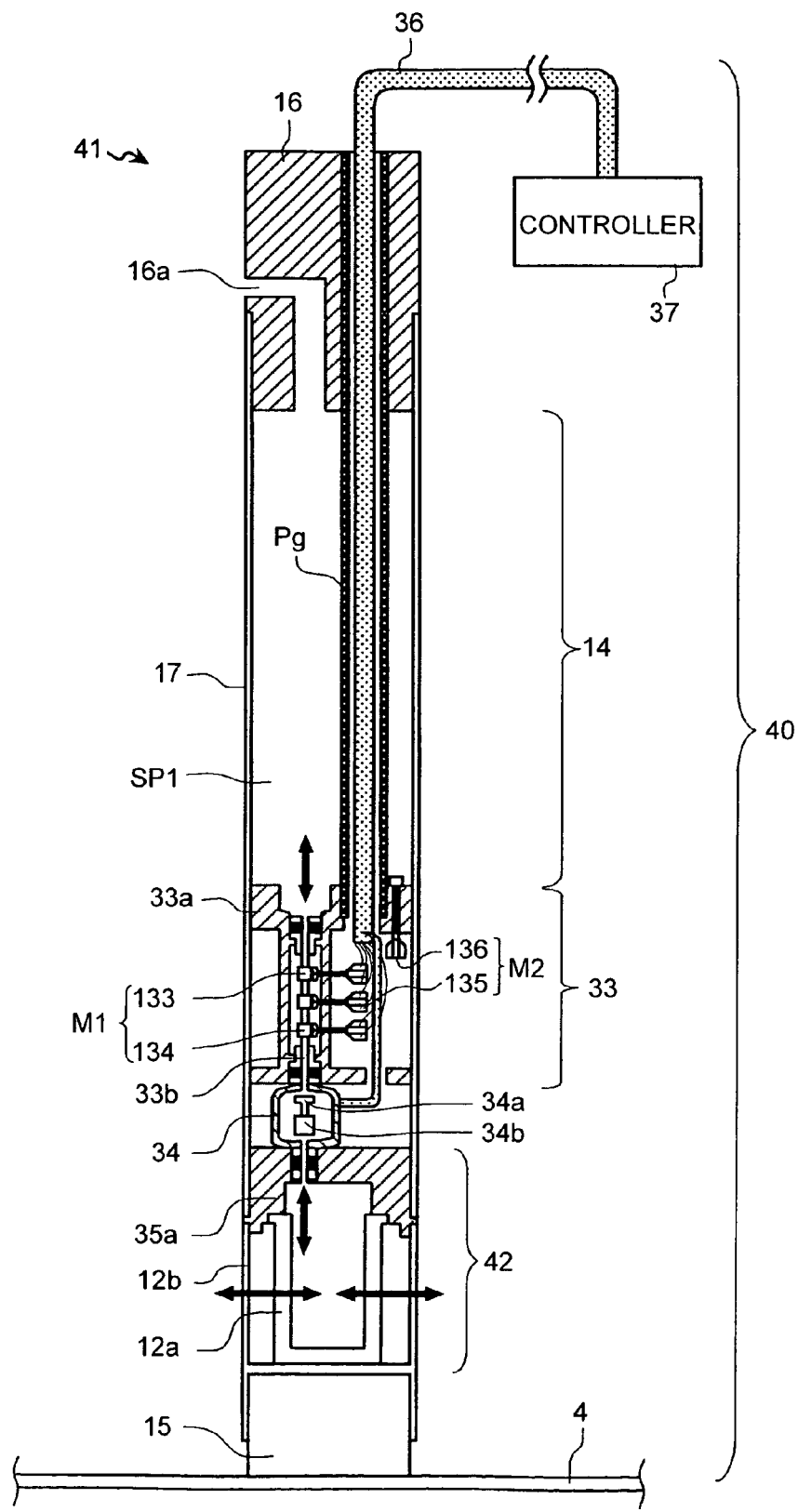
FIG. 16 is a schematic partially-omitted sectional view of a general arrangement of a leak detecting system according to a fourth embodiment the present invention.
Figure 17:
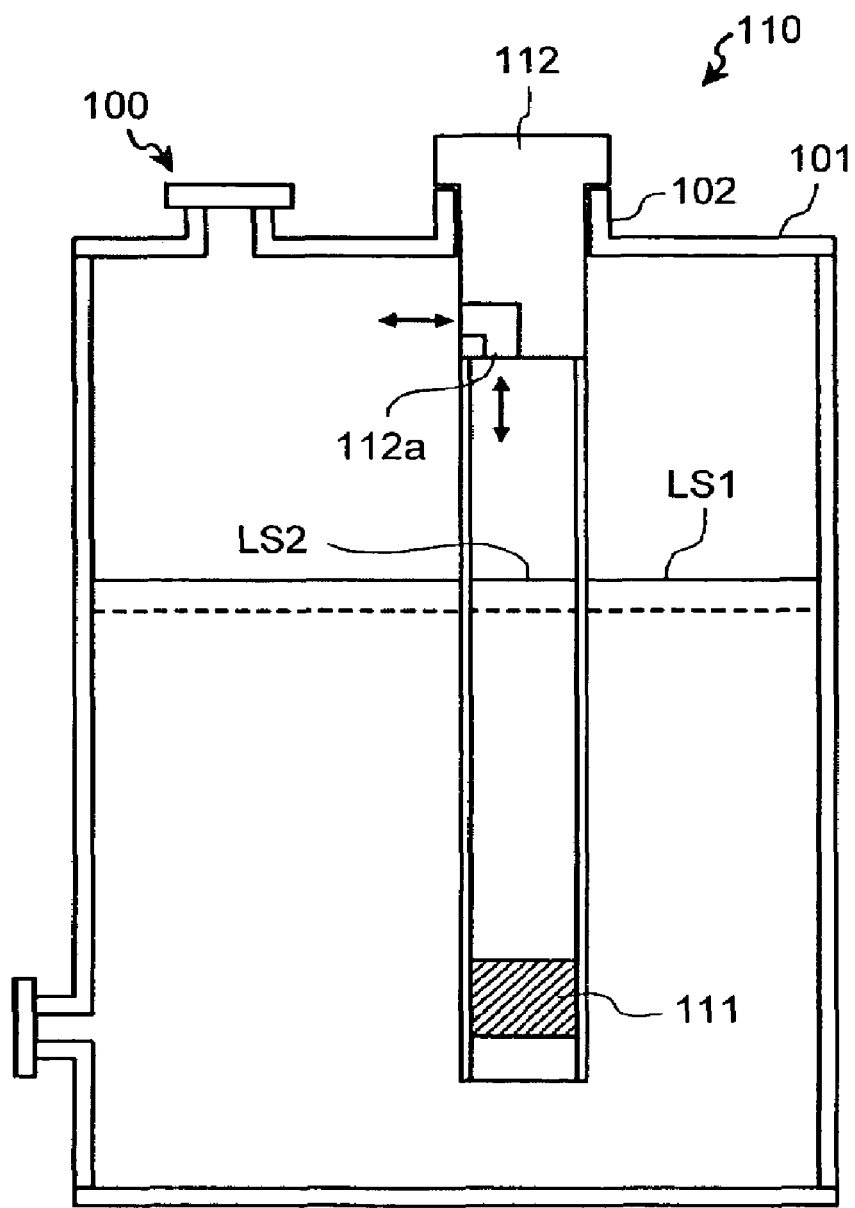
FIG. 17 is a schematic sectional view of a tank in which a conventional leak detector is installed.
Figure 18:
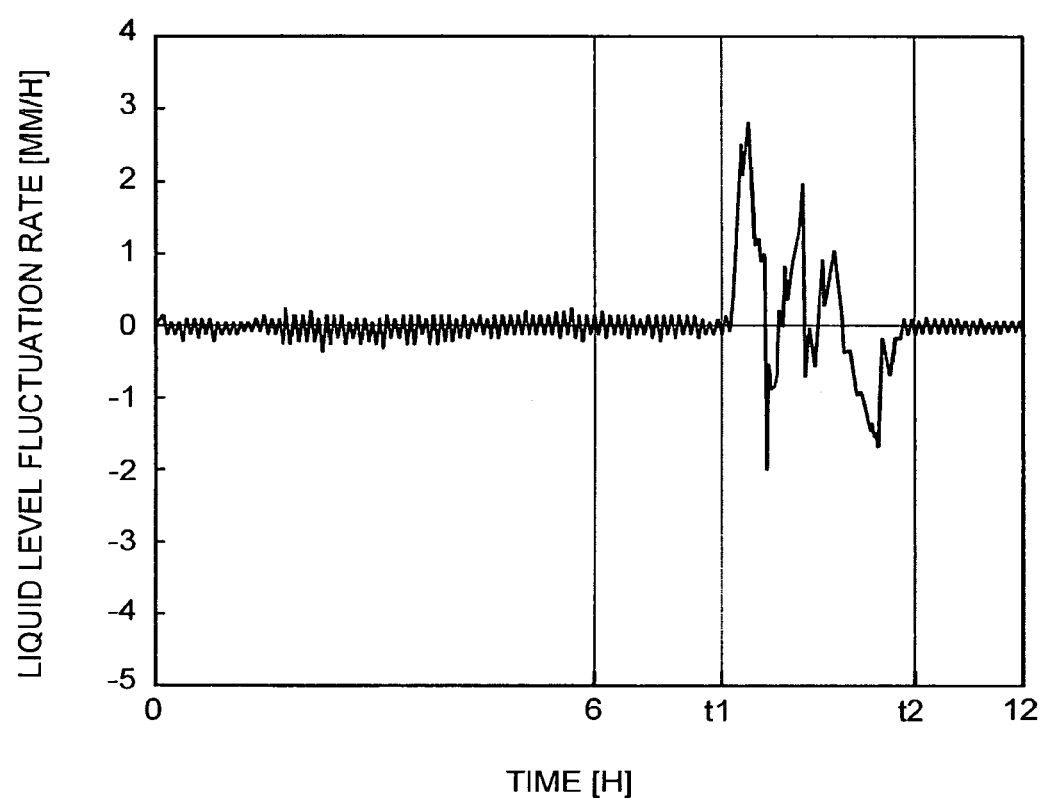
FIG. 18 is a graph for illustrating a measurement result of the liquid-level fluctuation rate in the conventional leak detecting system.

FIG. 16 is a schematic partially-omitted sectional view of a general arrangement of a leak detecting system according to the fourth embodiment. The state in which this leak detecting system 40 is installed in a tank 1 is illustrated schematically in FIG. 16. The leak detecting system 40 has a leak detector 41 in place of the leak detector 31. The leak detector 41 has a liquid inlet/outlet portion 42 in place of the liquid inlet/outlet portion 35 and has the cap 16 in place of the cap 32. Furthermore, the leak detector 31 has the magnet 15 disposed at the lower end of the liquid inlet/outlet portion 42. Besides these, the arrangement is the same as that of the third embodiment and the same components are provided with the same symbols.

As shown in FIG. 16, the liquid inlet/outlet portion 42 has the filter 12a, the filter cover 12b, and the filter holder 35a. The liquid inlet/outlet portion 42 thus exhibits the same actions and effects as do the liquid inlet/outlet portions 12 and 35. The magnet 15 detachably arrests the lower end of the liquid inlet/outlet portion 42, that is, the lower end of the filter cover 12b to the bottom plate 4 of the tank 1.

With the present embodiment, since substantially the same arrangement as that of the first embodiment and substantially the same arrangement as that of the third embodiment are provided, both the actions and effects of the first embodiment and the actions and effects of the third embodiment are provided.

That is, the present embodiment is arranged to have a flow-rate measuring unit, which makes liquid flow through the liquid retaining portion 14, the measuring capillary 33b, the solenoid valve 34, and the liquid inlet/outlet portion 42 and can measure the liquid flow rate inside the measuring capillary 33b as the liquid flow rate inside the tank with the air pressures inside the liquid retaining portion 14 and inside the tank being made substantially equal constantly and the liquid inside the liquid retaining portion 14 and the liquid inside the tank undergoing liquid level fluctuations in the same manner. In addition, the solenoid valve 34, which can freely open and close the lower end of the measuring capillary 33b or other opening for liquid flow, is used to directly stop the liquid flow inside the measuring capillary 33b, thus enabling detection of the temperature difference of the liquid inside the measuring capillary 33b in the state in which the flow is stopped by the solenoid valve 34. Furthermore, the lower end portion of the detector is arrested to the bottom plate of the tank by magnetic force while the upper end portion of the detector is supported in a such a manner that the detector is freely movable in a vertical direction via an O-ring at the gauging port or other portion of the top plate of the tank. Thus, even when distortions, especially distortions of the top plate or the side plate of the tank occur due to the expansion and shrinkage of the tank in accompaniment with variations of the temperature of the environment in which the tank is installed, the height of the flow-rate measuring unit with respect to the bottom plate of the tank can be kept fixed constantly, and even if the air pressures inside the tank and inside the liquid retaining portion 14 vary in accompaniment with the variation of the environmental temperature, the liquid flow within the measuring capillary 33b can be stopped definitely. A leak detector can thus be realized with which false liquid flow rates, arising due to variations of the height of the flow-rate measuring unit with respect to the bottom plate, can be prevented from being measured erroneously as non-zero flow rates and the temperature difference of the liquid inside the measuring capillary 33b when the liquid fluctuation rate is zero can be measured definitely.

Also, since this embodiment has this leak detector and a controller, which detects the level fluctuation rate of the liquid inside the tank, detects the leakage of liquid from the tank based on the liquid-level fluctuation rate, outputs an alarm that notifies the occurrence of the liquid leakage, and performs the process of calibrating the flow-rate measuring unit based on the temperature difference of the liquid inside the measuring capillary 33b when the liquid-level fluctuation rate is zero, a leak detecting system can be realized with which false leakage detection and other forms of erroneous recognition due to variations of the height of the flow-rate measuring unit with respect to the bottom plate can be restrained even when distortions, especially distortions of the top plate or the side plate of the tank occur due to the expansion and shrinkage of the tank in accompaniment with variations of the temperature of the environment in which the tank is installed, and with which even when the air pressures inside the tank and inside the liquid retaining portion 14 vary in accompaniment with the variation of the environmental temperature, the process of calibrating the flow-rate measuring unit can be performed definitely, and thus with which the measurement error of the liquid flow rate inside the tank can be reduced and a leakage detection process of high precision can be performed.

Furthermore, since as the means of detecting the liquid-level fluctuation rates of the liquid stored in the tank, the leak detecting system is equipped with the dual fixed-point flow-rate measuring unit M1, having the temperature sensors 133 and 134, and the constant temperature controlling flow-rate measuring unit M2, having the indirectly-heating temperature sensor 135 and the temperature sensor 136, the system has an effective detection range covering six orders of magnitude from ultramicroscopic liquid level fluctuations to liquid level fluctuations of large amounts inside the tank and can thus constantly perform the tank state judging process based on the liquid level fluctuation inside the tank, accurately judge various states of the tank in relation to liquid amount fluctuations of the stored liquid, and readily perform early detection of the occurrence of leakage.

Also, since in performing the leakage judging process or the tank state judging process in relation to the tank, the leak detecting system does not require preliminary tasks, such as the drawing of the stored liquid, etc., or preliminary work, such as the sealing of the tank, etc., the operation of the tank does not have to be stopped during the period of performing the leakage judging process or the tank state judging process. Economic losses, incurred on the tank-owning operator in the process of performing the leak detecting task on the tank, can thus be reduced.

Although with the present invention, embodiments wherein the sending and receiving of signals between the controlling unit and the notifying unit are performed by wired communication were explained, this invention is not limited thereto, and the controlling unit and the notifying unit may be provided with wireless communication interfaces and the control signal and various other signals can be sent to the notifying unit by the controlling unit performing wireless communication with the notifying unit. In this case, since the notifying unit that performs the leakage detection alarm output can be installed at a remote location with respect to the tank, a leak detecting system that enables remote monitoring of leak detection can be realized.

Moreover, while in the present invention, examples in which the tank is a cylindrical, above-ground tank have been explained, the present invention is not limited thereto and the shape of the tank may be a shape other than a cylindrical shape, such as a spherical shape or rectangular parallelepiped shape, and the tank may be an underground tank.

Furthermore, while in the present invention, examples in which the shape of the leak detector is tubular have been explained, the present invention is not limited thereto and the cross-sectional shape of the leak detector may be a shape other than a circle, such as an elliptical shape or a polygonal shape.

Moreover, while in the present invention, examples in which the opening/closing valve 34a of the solenoid valve 34 closes off the lower end of the measuring capillary 33b to stop the flow of liquid inside the measuring capillary 33b have been explained, the present invention is not limited thereto, and the opening/closing valve 34a of the solenoid valve 34 may close off the upper end of the measuring capillary 33b to stop the flow of liquid inside the measuring capillary 33b or may close off the opening at the lower end of the solenoid valve 34, that is, the upper end of the opening of the filter holder 35a to stop the flow of liquid inside the measuring capillary 33b.

Furthermore, while in the present invention, embodiments in which the flow of liquid inside the measuring capillary 33b is stopped using the solenoid valve 34 have been explained, the present invention is not limited thereto and a motor valve may be used instead to stop the flow of liquid inside the measuring capillary 33b.

As explained above, according to the present invention, such a leak detector can be realized that can be prevented from being vertically moved due to distortions, especially distortions or the like of a top plate and a side plate of a tank caused due to expansion and shrinkage of the tank in accompaniment with variations in temperature in an environment in which the tank is installed, and that can maintain a position of a flow-rate measuring unit invariant with respect to a bottom plate of the tank and can thus prevent false liquid flow rates, arising due to variations in the position of the flow-rate measuring unit with respect to the bottom plate, from being erroneously recognized as non-zero flow rates.

Moreover, according to the present invention, such a leak detecting system can be realized applying the leak detector that can restrain false detection of leakage and other forms of erroneous recognition due to variations in the position of the flow-rate measuring unit with respect to the bottom plate, that can perform a leak detection process with high precision, and that can readily perform early detection of leakage in the tank even when distortions, especially distortions of the top plate or the side plate of the tank, occur due to the expansion and shrinkage of the tank in accompaniment with variations in the temperature in the environment in which the tank is installed.

Furthermore, according to the present invention, such a leak detector can be realized that can securely stop the liquid flow inside the measuring capillary and can accurately detect difference in temperature of the liquid inside the measuring capillary when the liquid-level fluctuation rate is zero, even if the air pressures inside the tank and inside the liquid retaining portion vary in accompaniment with variation in the temperature of the environment in which the tank is installed.

Moreover, according to the present invention, such a leak detecting system can be realized applying the leak detector that can perform a process of accurately calibrating the flow-rate measuring unit and can reduce an error in measuring the liquid flow rate inside the tank, even when the air pressures inside the tank and inside the liquid retaining portion vary in accompaniment with variation in the temperature of the environment in which the tank is installed, and that can thus perform a leakage detection process with high precision and readily perform early detection of leakage in the tank.

Furthermore, according to the present invention, such a leak detector can be realized that is not vertically moved and can thus maintain the position of the flow-rate measuring unit invariant with respect to the bottom plate of the tank, even when distortions, especially distortions of the top plate or the side plate of a tank, occur due to expansion and shrinkage of the tank in accompaniment with variations in temperature in the environment in which the tank is installed, that can securely stop the liquid flow inside the measuring capillary even when the air pressures inside the tank and inside the liquid retaining portion vary in accompaniment with the variation in the temperature in the environment in which the tank is installed, and that can thus prevent false liquid flow rates, arising due to variations of the height of the flow-rate measuring unit with respect to the bottom plate, from being erroneously recognized as non-zero flow rates, and accurately detect temperature difference of the liquid inside the measuring capillary when the liquid-level fluctuation rate is zero.

Moreover, according to the present invention, such a leak detecting system can be realized applying the leak detector that can restrain false detection of leakage and other forms of erroneous recognition due to variations in the position of the flow-rate measuring unit with respect to the bottom plate of a tank even when distortions, especially distortions of the top plate or the side plate of the tank, occur due to the expansion and shrinkage of the tank in accompaniment with variations in the temperature of the environment in which the tank is installed, that can perform a process of accurately calibrating the flow-rate measuring unit and reduce the measurement error in the liquid flow rate inside the tank even when the air pressures inside the tank and inside the liquid retaining portion 14 vary in accompaniment with the variation in environmental temperature, and can thus further improve detection precision of the leakage detection process and readily perform early detection of leakage in the tank.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

INDUSTRIAL APPLICABILITY

As explained above, the present invention is suitable for a leak detector and a leak detecting system using the same, with which degradation of precision in detecting leakage due to variations in environmental temperature can be restrained and early and highly precise detection of leakage of liquid can be performed.

The invention claimed is:

1. A leak detector for detecting leakage of liquid stored in a tank based on fluctuation in a level of the liquid, the tank including a top plate, a bottom plate, and a side plate connecting the top plate and the bottom plate, the leak detector comprising:
a flow-rate measuring portion, provided near a bottom end of the leak detector, for measuring a flow rate between liquid in the tank and liquid retained within the leak detector;
a bottom attaching portion provided at the bottom end of the leak detector to detachably attach the bottom end to the bottom plate;
a top assembly, attached to the top plate so as to cover an opening provided in the top plate and having a through opening through which an upper end of the leak detector is supported in such a manner that the upper end of the leak detector is simultaneously movable relatively to the top plate in a direction substantially perpendicular to a surface of the liquid while the bottom end of the leak detector is detachably attached to the bottom plate;
a liquid inlet/outlet portion near the bottom end through which the liquid flows in and out of the leak detector;
a flow-rate measuring unit arranged near the liquid inlet/outlet portion inside the leak detector toward the upper end, and configured to measure an amount of flow of the liquid occurring through the liquid inlet/outlet portion; and
a liquid retaining portion arranged between the upper end and the flow-rate measuring unit, and including a space configured to retain liquid that has flown therein through the liquid inlet/outlet portion;
wherein the flow-rate measuring unit includes:
a flow path capillary through which liquid flows between the space and the liquid inlet/outlet portion;
at least one temperature detecting unit configured to detect temperature of liquid inside the flow path;
a heating unit configured to heat the liquid inside the flow path capillary; and
a controlling unit configured to control heating temperature of the heating unit for heating the liquid inside the flow path capillary so that the temperature of liquid inside the liquid retaining portion and the temperature of the liquid inside the flow path capillary become substantially equal.

2. A leak detector for detecting leakage of liquid stored in a tank based on fluctuation in a level of the liquid, the leak detector comprising:
a liquid retaining portion including a space configured to retain liquid flown into the leak detector, the liquid flown being a part of the liquid in the tank;
a flow-rate measuring unit including:
a flow path capillary through which the space communicates with an interior of the tank and through which the liquid flows in and out, wherein the flow rate measuring unit is configured to measure an amount of the liquid flowing inside the flow path capillary; and
a flow path opening/closing unit configured to open and close at least one end of the flow path capillary to control the flow of the liquid into the flow path capillary; wherein said flow path opening/closing unit is located at the at least one end of said flow path capillary; and
a calibrating unit configured to calibrate the flow-rate measuring unit under a closing operation of the flow path opening/closing unit.

3. The leak detector according to claim 2, wherein the calibrating unit calibrates the flow-rate measuring unit based on a signal corresponding to temperature of liquid being inside the flow path capillary without flowing.

4. The leak detector according to claim 2, wherein the flow-path opening/closing unit includes a solenoid valve.

5. A leak detector for detecting leakage of liquid stored in a tank based on fluctuation in a level of the liquid, the leak detector comprising:
a liquid retaining portion including a space configured to retain liquid flown into the leak detector, the liquid flown being a part of the liquid in the tank;
a flow-rate measuring unit provided with a flow path capillary through which the space communicates with an interior of the tank and through which the liquid flows in and out and configured to measure an amount of the liquid flowing inside the flow path capillary;
wherein the flow-rate measuring unit includes
at least one temperature detecting unit configured to detect temperature of liquid inside the flow path capillary;
a heating unit configured to heat the liquid inside the flow path capillary; and
a controlling unit configured to control heating temperature of the heating unit for heating the liquid inside the flow path capillary so that the temperature of liquid inside the liquid retaining portion and the temperature of the liquid inside the flow path capillary become substantially equal,
a flow path opening/closing unit configured to open and close at least one end of the flow path capillary to control the flow of the liquid into the flow path capillary; and
a calibrating unit configured to calibrate the flow-rate measuring unit under a closing operation of the flow path opening/closing unit.

6. A leak detector for detecting leakage of liquid stored in a tank based on fluctuation in a level of the liquid, the tank including a top plate, a bottom plate, and a side plate connecting the top plate and the bottom plate, the leak detector comprising:
a liquid retaining portion including a space configured to retain liquid flown into the leak detector, the liquid flown being a part of the liquid in the tank;
a flow-rate measuring unit provided near a bottom end of the leak detector, provided with a flow path capillary through which the liquid flows in and out and configured to measure an amount of the liquid flowing inside the flow path capillary;

a flow path opening/closing unit configured to open and close at least one end of the flow path capillary;

a calibrating unit configured to calibrate the flow-rate measuring unit under a closing operation of the flow path opening/closing unit;

a bottom attaching portion provided at the bottom end of the leak detector to detachably attach the bottom end to the bottom plate; and a top assembly, attached to the top plate so as to cover an opening provided in the top plate and having a through opening through which an upper end of the leak detector is supported in such a manner that the upper end of the leak detector is simultaneously movable relatively to the top plate in a direction substantially perpendicular to a surface of the liquid while the bottom end of the leak detector is detachably attached to the bottom plate.

7. The leak detector according to claim 6, wherein the bottom end is detachably attached to the bottom plate with a magnet.

8. The leak detector according to claim 6, wherein the upper end is supported in the through opening using an elastic member.

9. The leak detector according to claim 6, wherein the flow-rate measuring unit includes:

at least one temperature detecting unit configured to detect temperature of liquid inside the flow path capillary;

a heating unit configured to heat the liquid inside the flow path capillary; and a controlling unit configured to control heating temperature of the heating unit for heating the liquid inside the flow path capillary so that the temperature of liquid inside the liquid retaining capillary and the temperature of the liquid inside the flow path portion become substantially equal.

10. The leak detector according to claim 6, wherein the calibrating unit calibrates the flow-rate measuring unit based on a signal corresponding to temperature of liquid being inside the flow path capillary without flowing.

11. The leak detector according to claim 6, further comprising a protective member configured to protect the flow-rate measuring unit and the liquid retaining portion from the liquid, and arranged outside the flow-rate measuring unit and the liquid retaining portion, wherein the protective member is formed with a metal having such a thermal expansion coefficient that a distance between the flow-rate measuring unit and the bottom plate is maintained substantially invariant.

12. The leak detector according to claim 11, wherein the protective member is formed with a material identical to a material of the tank.

13. The leak detector according to claim 6, wherein the flow-path opening/closing unit includes a solenoid valve.

14. A leak detecting system for detecting leakage of liquid stored in a tank based on fluctuation in a level of the liquid, the leak detecting system comprising:

a leak detector including a liquid retaining portion including a space configured to retain liquid flown into the leak detector, the liquid flown being a part of the liquid in the tank;

a flow-rate measuring unit including a flow path capillary through which the space communicates with an interior of the tank and through which the liquid flows in and out, wherein the flow-rate measuring unit is configured to measure an amount of the liquid flowing inside the flow path capillary;

a flow path opening/closing unit configured to open and close at least one end of the flow path capillary so as to control the flow of the liquid into the flow path capillary;

wherein the flow path opening/closing unit is located at the at least one end of said flow path capillary; and a calibrating unit configured to calibrate the flow-rate measuring unit under a closing operation of the flow path opening/closing unit; and a controller configured to control the leak detector.

15. A leak detecting system for detecting leakage of liquid stored in a tank based on fluctuation in a level of the liquid, the tank including a top plate, a bottom plate, and a side plate connecting the top plate and the bottom plate, the leak detecting system comprising:

a leak detector including a liquid retaining portion including a space configured to retain liquid flown into the leak detector, the liquid flown being a part of the liquid in the tank;

a flow-rate measuring unit provided near a bottom end of the leak detector, provided with a flow path capillary through which the space communicates with an interior of the tank and through which the liquid flows in and out and configured to measure an amount of the liquid flowing inside the flow path capillary;

a flow path opening/closing unit configured to open and close at least one end of the flow path capillary; and a calibrating unit configured to calibrate the flow-rate measuring unit under a closing operation of the flow path opening/closing unit; and a controller configured to control the leak detector, wherein the leak detector is arranged inside the tank in such a manner that a bottom end of the leak detector is detachably attached to the bottom plate while an upper end of the leak detector is supported in a through opening provided in the top plate in such a manner that the upper end of the leak detector is simultaneously movable relatively to the top plate in a direction substantially perpendicular to a surface of the liquid while the bottom end of the leak detector is detachably attached to the bottom plate.

* * * * *